(12) United States Patent
Mitsubayashi

(10) Patent No.: US 10,841,478 B2
(45) Date of Patent: Nov. 17, 2020

(54) IMAGE SENSOR AND CONTROL SYSTEM

(71) Applicant: Sony Semiconductor Solutions Corporation, Kanagawa (JP)

(72) Inventor: Hideki Mitsubayashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/482,586

(22) PCT Filed: Dec. 1, 2017

(86) PCT No.: PCT/JP2017/043300
§ 371 (c)(1),
(2) Date: Jul. 31, 2019

(87) PCT Pub. No.: WO2018/159046
PCT Pub. Date: Sep. 7, 2018

(65) Prior Publication Data
US 2020/0014838 A1 Jan. 9, 2020

(30) Foreign Application Priority Data
Mar. 2, 2017 (JP) .................. 2017-039010

(51) Int. Cl.
*H04N 5/232* (2006.01)
*H04N 5/225* (2006.01)
*H04N 5/073* (2006.01)

(52) U.S. Cl.
CPC ....... *H04N 5/23203* (2013.01); *H04N 5/0733* (2013.01); *H04N 5/2258* (2013.01); *H04N 5/232061* (2018.08)

(58) Field of Classification Search
CPC ............. H04N 5/23203; H04N 5/2258; H04N 5/0733; H04N 5/232061; H04N 7/18;
(Continued)

(56) References Cited

U.S. PATENT DOCUMENTS

2001/0020853 A1* 9/2001 Haq .................. H04L 7/0008
327/18
2005/0159914 A1* 7/2005 Sunden ............. H04W 56/0015
702/125

(Continued)

FOREIGN PATENT DOCUMENTS

| JP | 2009-055554 A | 3/2009 |
|---|---|---|
| JP | 2013-175128 A | 9/2013 |
| JP | 2014-179841 A | 9/2014 |

OTHER PUBLICATIONS

Extended European Search Report dated Dec. 11, 2019 for corresponding European Application 17899145.1.

*Primary Examiner* — Abdelaaziz Tissire
(74) *Attorney, Agent, or Firm* — Michael Best & Friedrich LLP

(57) ABSTRACT

Provided is an image sensor configured to function as a synchronous master that controls synchronous imaging performed by a plurality of image sensors. In a case where a stop request is acquired, the image sensor stops imaging operation on the basis of the stop request, and does not transmit, to a different image sensor functioning as a synchronous slave that performs imaging under control by the synchronous master, a synchronous slave synchronous signal for controlling imaging timing of an image sensor functioning as the synchronous slave on the basis of the stop request.

18 Claims, 11 Drawing Sheets

(58) Field of Classification Search
CPC .......... H04N 7/181; H04N 5/04; H04N 5/247;
H04N 5/232; H04N 2101/00; H04N
1/00307; H04N 1/2112; H04N 5/23206;
H04N 2201/0084; H04N 5/765
See application file for complete search history.

(56) References Cited

U.S. PATENT DOCUMENTS

| | | | |
|---|---|---|---|
| 2007/0291887 A1* | 12/2007 | Ishimoto | H04L 25/05 375/371 |
| 2011/0148850 A1* | 6/2011 | Kadota | G09G 3/3685 345/213 |
| 2011/0153889 A1* | 6/2011 | Barrenscheen | H04L 12/403 710/110 |
| 2011/0157389 A1 | 6/2011 | McClellan | |
| 2011/0185215 A1* | 7/2011 | Neben | H04L 7/00 713/401 |
| 2012/0194712 A1 | 8/2012 | Crook et al. | |
| 2013/0278728 A1 | 10/2013 | Gong et al. | |
| 2013/0336341 A1* | 12/2013 | Kamada | H04J 3/0667 370/503 |
| 2014/0281753 A1 | 9/2014 | Wagh et al. | |
| 2016/0227198 A1 | 8/2016 | Ooba | |
| 2016/0373640 A1 | 12/2016 | van Hoff et al. | |
| 2017/0078554 A1* | 3/2017 | Suzuki | H04H 20/38 |

\* cited by examiner

IMAGE SENSOR AND CONTROL SYSTEM

TECHNICAL FIELD

The present disclosure relates to an image sensor and a control system.

BACKGROUND ART

For example, development of a technology relating to connection between devices, such as connection between a processor and a sensor is in progress. A technology described in PTL 1 is an example of the technology relating to connection between devices.

CITATION LIST

Patent Literature

[PTL 1]
US 2014/0281753

SUMMARY

Technical Problem

For example, with higher performance and more diversified functionality of electronic equipment, there has been developed an electronic equipment including a plurality of image sensors, as an electronic equipment of a type including a processing apparatus such as a processor. According to the electronic equipment including a plurality of image sensors, a processing apparatus and each of a plurality of image sensors are electrically connected via a control bus such as I2C (example of signal transmission path). Moreover, in case of the electronic equipment including the plurality of image sensors, imaging operation performed by the plurality of image sensors is controlled in accordance with various requests transmitted from the processing apparatus to each of the image sensors via the control bus to control operations of the image sensors, for example.

Methods adoptable by the electronic equipment which includes the plurality of image sensors as described above to stop imaging operation performed by the plurality of image sensors include such a method which broadcasts a stop request from the processing apparatus via the control bus, for example. Each of the image sensors stops imaging in response to a stop request acquired via the control bus. Accordingly, in a case where the foregoing method is used, a plurality of image sensors can synchronously stop imaging operation.

However, in a case where a stop request broadcasted via the control bus is used as in the foregoing method, there is a possibility that a simultaneous stop of imaging operation performed by all the image sensors in response to the stop request is difficult to achieve for various reasons such as a transmission delay. Accordingly, in case of the electronic equipment using the foregoing method, imaging operation performed by all the image sensors is difficult to securely stop in an identical frame, for example.

The present disclosure proposes an image sensor and a control system which are novel and refined, and capable of achieving a synchronous stop of imaging operation performed by a plurality of image sensors.

Solution to Problem

According to the present disclosure, provided is an image sensor configured to function as a synchronous master that controls synchronous imaging performed by a plurality of image sensors, in which, in a case where a stop request is acquired, the image sensor stops imaging operation on the basis of the stop request, and does not transmit, to a different image sensor functioning as a synchronous slave that performs imaging under control by the synchronous master, a synchronous slave synchronous signal for controlling imaging timing of an image sensor functioning as the synchronous slave on the basis of the stop request.

Further, according to the present disclosure, provided is an image sensor configured to function as a synchronous slave that performs imaging under control by a synchronous master that controls synchronous imaging performed by a plurality of sensors, in which imaging operation is stopped in a case where, before an elapse of a set predetermined period from acquisition of a synchronous slave synchronous signal from the synchronous master as a signal for controlling imaging timing of the image sensor functioning as the synchronous slave, the next synchronous slave synchronous signal is not acquired.

Further, according to the present disclosure, provided is a control system including: a processing apparatus; and a plurality of image sensors each connected to the processing apparatus via a data bus and a control bus, in which one of the plurality of image sensors functions as a synchronous master configured to control synchronous imaging performed by the plurality of image sensors, a different image sensor included in the plurality of image sensors functions as a synchronous slave that performs imaging under control by the synchronous master, the image sensor functioning as the synchronous master and the image sensor functioning as the synchronous slave are connected to each other via a signal line different from the data bus and the control bus, and in a case where a stop of imaging operation performed by the plurality of image sensors is intended, the processing apparatus transmits a stop request to the image sensor functioning as the synchronous master via the control bus, the image sensor functioning as the synchronous master stops imaging operation on the basis of the stop request, and does not transmit a synchronous slave synchronous signal for controlling imaging timing of the image sensor functioning as the synchronous slave to the image sensor functioning as the synchronous slave, and the image sensor functioning as the synchronous slave stops imaging operation in a case where the next synchronous slave synchronous signal is not acquired before an elapse of a set predetermined period from acquisition of the synchronous slave synchronous signal.

Further, according to the present disclosure, provided is a control system including: a processing apparatus; and a plurality of image sensors each connected to the processing apparatus via a data bus, a control bus, and a signal line different from the data bus and the control bus, in which the processing apparatus functions as a synchronous master that controls synchronous imaging performed by the plurality of image sensors, the plurality of image sensors each functions as a synchronous slave that performs imaging under control by the synchronous master, and in a case where a stop of imaging operation performed by the plurality of image sensors is intended, the processing apparatus does not transmit a synchronous slave synchronous signal for controlling imaging timing of the image sensors each functioning as the synchronous slave via the signal line, and the plurality of image sensors each stops imaging operation in a case where the next synchronous slave synchronous signal is not acquired before an elapse of a set predetermined period from acquisition of the synchronous slave synchronous signal.

Advantageous Effect of Invention

According to the present disclosure, a synchronous stop of imaging operation performed by a plurality of image sensors is achievable.

Note that advantageous effects to be produced are not limited to the effects described above, but may be any effects presented in the present description, or other effects conceivable in the light of the present description in addition to or in place of the effects described above.

DESCRIPTION OF EMBODIMENTS

Figure 1:
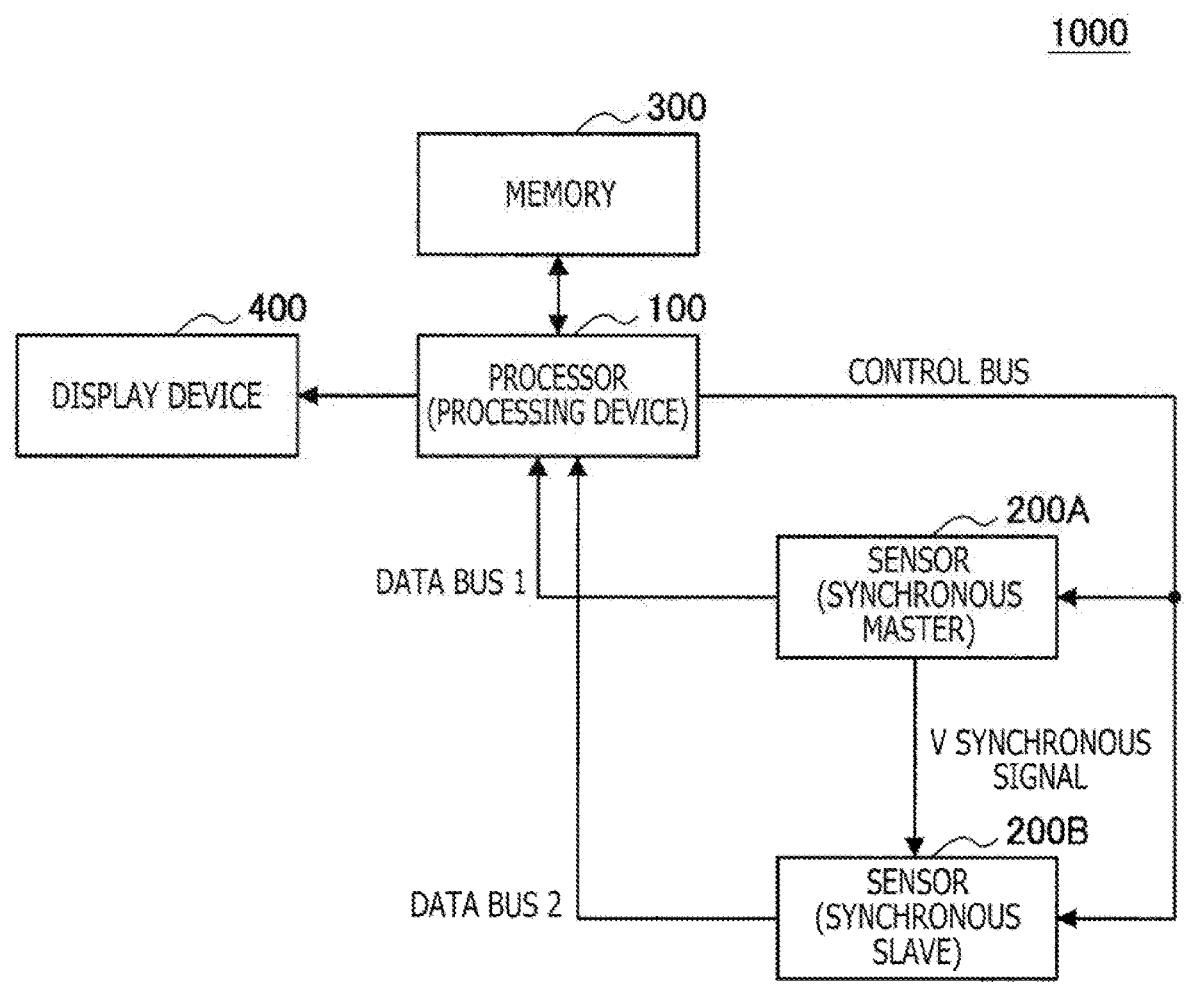
FIG. 1 is an explanatory diagram depicting a first configuration example of a control system according to a present embodiment.

Preferred embodiments of the present disclosure are hereinafter described in detail with reference to the accompanying drawings. Note that in the present description and drawings, constituent elements having substantially identical functional configurations are given identical reference numerals. The same description is therefore not repeated.

In addition, the description is hereinafter presented in a following order.
1. Control system according to present embodiment
2. Program according to present embodiment
(Configuration of Control System According to Present Embodiment)
[1] Configuration of Control System According to Present Embodiment Initially described is an example of a configuration of a control system according to the present embodiment. The control system according to the present embodiment is a system which includes a processor (the processor presented herein is an example of a processing apparatus according to the present embodiment. This definition is applicable to following examples) and a plurality of image sensors.

Examples of the control system according to the present embodiment include a communication device such as a smartphone, a drone (equipment operable by remote operation or by autonomous operation), a moving body such as an automobile, a computer such as a PC (Personal Computer), a tablet-type apparatus, a game machine, and other various types of electronic equipment. Needless to say, application examples of the control system according to the present embodiment are not limited to the examples described above.

According to the control system of the present embodiment, one of apparatuses constituting the control system functions as a "synchronous master." The synchronous master of the present embodiment is an apparatus which controls synchronous imaging performed by a plurality of image sensors. For example, the device functioning as the synchronous master is one of the plurality of image sensors, or a processor.

Moreover, according to the control system of the present embodiment, an image sensor included in the plurality of image sensors constituting the control system and not functioning as the synchronous master functions as a "synchronous slave." The synchronous slave according to the present embodiment is an apparatus which performs imaging under control by the synchronous master. The image sensor functioning as the synchronous slave receives a synchronous signal transmitted from the synchronous master, and operates on the basis of the synchronous signal.

The synchronous master according to the present embodiment generates a synchronous signal as a reference, and transmits the synchronous signal to difference apparatuses to control synchronous imaging performed by the plurality of image sensors.

For example, the synchronous master controls a start of imaging operation and a stop of imaging operation, such as imaging timing control, to implement synchronous imaging operation performed by the image sensors functioning as the synchronous slaves. In the following description, a synchronous signal according to the present embodiment is expressed as "Vsync," "synchronous signal Vsync," "Vsync_out," "synchronous signal Vsync_out," "Vsync_in," "synchronous signal Vsync_in," or "V synchronous signal" in some cases. Moreover, in the following description, a synchronous signal transmitted from the synchronous master to a different apparatus is expressed as a "synchronous slave synchronous signal" in some cases.

More specifically, the control system according to the present embodiment can be classified into following two embodiments, depending on which of the image sensor and the processor functions as the synchronous master.

Control system according to first embodiment: one of the plurality of image sensors functions as the synchronous master, while the others of the plurality of image sensors function as the synchronous slaves.

Control system according to second embodiment: the processor functions as the synchronous master, while all the image sensors function as synchronous slaves.

Described hereinafter are a control system of the first embodiment and a control system of the second embodiment, in an example case where two image sensors are included in the control system of the present embodiment. Note that the number of the image sensors included in the control system of the present embodiment is not limited to two. The control system of the present embodiment may include three or more image sensors. Each of the image sensors included in the control system of the present embodiment is hereinafter simply referred to as a "sensor" in some cases.

[1-1] First Configuration Example of Control System of Present Embodiment

FIG. 1 is an explanatory view depicting a first configuration example of a control system 1000 according to the present embodiment, presenting an example of a configuration of the control system of the first embodiment including a plurality of image sensors one of which functions as a synchronous master.

For example, the control system 1000 according to the first configuration example includes a processor 100 (processing apparatus of present embodiment), a plurality of sensors 200A and 200B (image sensors of present embodiment) each having a function of outputting images, a memory 300, and a display device 400. In the following description, the plurality of sensors 200A and 200B is collectively referred to as "sensors 200," or a representative of the plurality of sensors 200A and 200B is referred to as a "sensor 200" in some cases.

Note that the number of the sensors 200 included in the control system of the present embodiment is not limited to the number depicted in the example in FIG. 1 which depicts the control system 1000 including the two sensors 200. For example, the number of the sensors 200 included in the control system according to the present embodiment may be three or more as described above.

Each of electric connections between the sensor 200A and the processor 100, and between the sensor 200B and the processor 100 is made via respective data buses. The data bus is a single transmission path connecting the processor 100 and the sensor 200. For example, data indicating an image output from the sensor 200 (hereinafter referred to as "image data" in some cases) is transmitted from the sensor 200 to the processor 100 via the data bus.

A signal transmitted via the data bus in the control system 1000 is sent under any standard specifying start and end of transmitted data by using predetermined data, such as CSI-2 standard and PCI Express. Examples of the predetermined data include frame start packet in CSI-2 standard, and frame end packet in CSI-2 standard. Needless to say, the signal transmitted via the data bus is not limited to the signal described in the example herein.

In addition, the processor 100 and each of the sensors 200 is electrically connected via a control bus different from the data bus. The control bus connecting the processor 100 and each of the sensors 200 is a transmission path for other signals. For example, control information (described below) output from the processor 100 is transmitted from the processor 100 to the sensor 200 via the control bus. Note that the processor 100 is connected to each of the plurality of sensors 200 via the single control bus in the example depicted in FIG. 1. However, the processor 100 may be connected to the plurality of sensors 200 via control buses different for each in the control system of the present embodiment. In addition, transmission and reception of control information (described below) between the processor 100 and each of the plurality of sensors 200 may be achieved using wireless communication of any communication system capable of transmitting and receiving the control information, for example, rather than via the control bus.

Moreover, the sensors 200 are connected to each other via a signal line different from the data bus and the control bus. The signal line connecting the respective sensors 200 may be a single line, or two or more lines. For example, the synchronous signal Vsync_out and synchronous signal Vsync_in described below are transmitted and received via the signal line connecting the sensors 200.

[1-1-1] Processor 100 (Processing Apparatus of Present Embodiment)

The processor 100 includes a single processor or two or more processors each including an arithmetic circuit such as an MPU (Micro Processing Unit), various types of processing circuits, and others. The processor 100 is driven by power supplied from an internal power supply (not depicted), such as a battery, which constitutes the control system 1000, or power supplied from an external power supply outside the control system 1000.

The processor 100 transmits control information to each of the sensors 200 via the control bus, for example.

For example, the control information of the present embodiment includes identification information indicating the sensor 200, and a processing request.

Examples of the identification information of the present embodiment include any data on the basis of which the sensor 200 can be specified, such as ID set for the sensor 200. The sensor 200 having acquired the control information, which includes identification information, via the control bus is capable of specifying whether or not the acquired information is control information transmitted to the corresponding sensor 200. Note that the control information is not required to include identification information in a case where the control system of the present embodiment has control buses different for each of the sensors 200, for example.

The processing request of the present embodiment is data indicating a command for controlling operation of the sensor 200. Examples of the processing request include a setting request for providing a setting which specifies the operation of the sensor 200, a start request for starting imaging operation performed by the sensor 200, and a stop request for stopping imaging operation performed by the sensor.

Note that data included in the control information of the present embodiment is not limited to the information of the example described above.

For example, the control information of the present embodiment may include setting information indicating a setting for specifying the operation of the sensor 200. Examples of the setting indicated by the setting information of the present embodiment include a "setting for specifying a function of the sensor 200, such as synchronous master and synchronous slave," a setting for specifying whether or not a frame start packet is output, a setting for specifying whether or not a frame end packet is output, a setting for specifying an image size, and a setting for specifying a frame rate.

For example, the sensor 200 performs operation corresponding to the setting indicated by setting information in response to transmission of the control information including the setting information from the processor 100 to the sensor 200 via the control bus.

The setting information herein may include a "setting for specifying the function of the sensor 200, such as synchronous master and synchronous slave" as described above. Accordingly, it is achievable that "the processor (processing apparatus of the present embodiment) sets the function performed by each of the plurality of sensors 200 (image sensors of the present embodiment) via the control bus" on the basis of the setting information indicating the setting for specifying the function of the sensor 200 and transmitted from the processor 100 to the sensor 200 via the control bus.

Note that the function performed by the sensor 200 in the control system 1000 is not necessarily set by the processor via the control bus. For example, each of the functions of the sensors 200 in the control system 1000 may be determined beforehand in a designing stage or a manufacturing stage of the system. Accordingly, for example, the sensor 200 of the present embodiment may have a "configuration operating to perform only the function of the synchronous master," a "configuration operating to perform only the function of the synchronous slave," or a "configuration operating to perform as the synchronous master or synchronous slave in accordance with setting information."

The processor 100 also performs image processing for images output from the respective sensors 200 via the data bus. For example, the image processing performed by the processor 100 is any image processing performed for images as processing targets, such as processing for combining images output from the respective sensors 200.

The processor 100 is further capable of performing various processing, such as processing associated with recording control for recording image data in a recording medium such as the memory 300, processing associated with display control for displaying images on a display screen of the display device 400, and processing for executing any application software. For example, the processing associated with recording control is "processing for transmitting, to a recording medium such as the memory 300, control data including a recording command and data to be recorded in the recording medium." For example, the processing associated with display control is "processing for transmitting, to a display device such as the display device 400, control data including a display command and data to be displayed on the display screen.

[1-1-2] Sensor 200 (Image Sensor of Present Embodiment)

The sensor 200 is an image sensor. For example, the image sensor according to the present embodiment includes an imaging device such as a digital still camera, a digital video camera, and a stereo camera, and any sensor device such as an infrared sensor and a range image sensor, and has a function of outputting generated images. The images generated by the sensor 200 herein correspond to data indicating a sensing result obtained by the sensor 200.

The sensor 200 performs operation corresponding to a setting indicated by setting information on the basis of the setting information stored in a recording medium such as a register constituting the sensor 200. For example, the sensor 200 operates to function as the synchronous master in a case where the setting information indicates operation as the synchronous master. In addition, for example, the sensor 200 operates to function as the synchronous slave in a case where the setting information indicates operation as the synchronous slave. An example of the operation of the sensor 200 functioning as the synchronous master, and an example of the operation of the sensor 200 functioning as the synchronous slave are described below.

FIG. 1 depicts an example of the sensor 200A functioning as the synchronous master, and the sensor 200B functioning as the synchronous slave. In case of the sensors 200 having functions set on the basis of setting information, the sensor 200B is allowed to function as the synchronous master, and the sensor 200A is allowed to function as the synchronous slave in the control system 1000.

Note that the functions performed by the sensors 200 may be determined beforehand, rather than set on the basis of setting information as described above.

Figure 2:
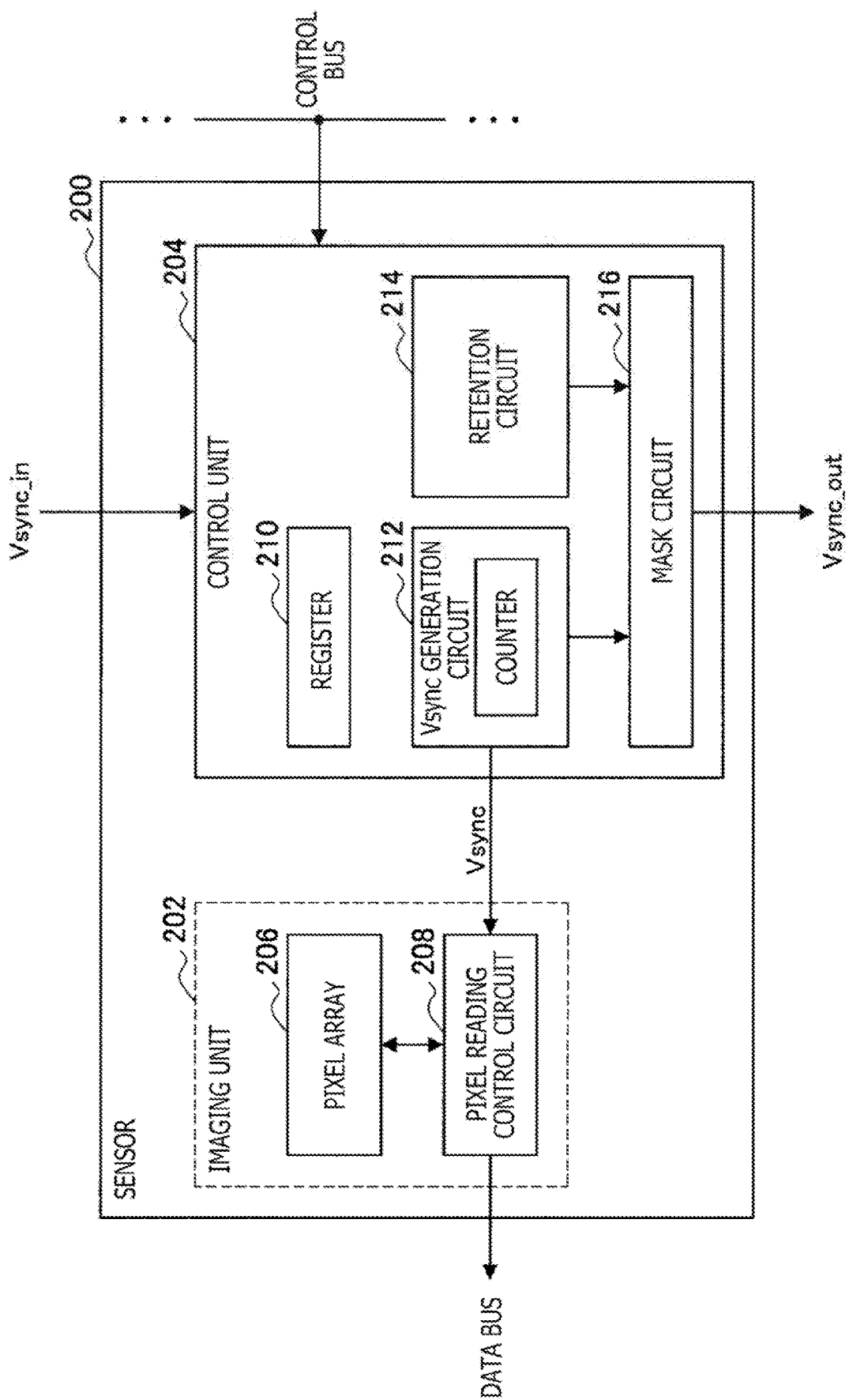
FIG. 2 is a block diagram depicting an example of a configuration of a sensor (image sensor) according to the present embodiment.

FIG. 2 is a block diagram depicting an example of the configuration of the sensor 200 (image sensor) according to the present embodiment. FIG. 2 depicts an example of the configuration of the sensor 200 operating as the synchronous master or the synchronous slave on the basis of setting information. Accordingly, FIG. 2 depicts an example of the configuration of the sensor 200 having both the function of operating as the synchronous master, and the function of operating as the synchronous slave. According to the sensor 200 having both the function of operating as the synchronous master and the function of operating as the synchronous slave, the effective function of the sensor 200 is specified on the basis of setting information. In a case where the sensor 200 is in a state that one of the function of operating as the synchronous master and the function of operating as the synchronous slave is effective, the other function does not become effective.

The signal "Vsync_out" depicted in FIG. 2 is a synchronous signal output in a case where the sensor 200 functions as the synchronous master. The signal "Vsync_out" depicted in FIG. 2 corresponds to a synchronous slave synchronous signal for controlling imaging timing of the different sensor 200 functioning as the synchronous slave. For example, the sensor 200 functioning as the synchronous master outputs the synchronous signal Vsync_out via a signal line connected to the different sensor 200 functioning as the synchronous slave. On the other hand, in a case where the sensor 200 operates as the synchronous slave, the sensor 200 does not output the synchronous signal Vsync_out.

Moreover, the signal "Vsync_in" depicted in FIG. 2 is a synchronous signal output from the external device functioning as the synchronous master, such as the different sensor 200 functioning as the synchronous master and the processor 100 functioning as the synchronous master. The "Vsync_in" depicted in FIG. 2 corresponds to the synchronous slave synchronous signal acquired from the different sensor 200 functioning as the synchronous master (example of external device), or the synchronous slave synchronous signal acquired from the processor 100 functioning as the synchronous master (example of external device). For example, the sensor 200 acquires the synchronous signal Vsync_in by receiving the synchronous signal Vsync_in input via the signal line connected to the external device functioning as the synchronous master. The sensor 200 functioning as the synchronous master does not perform processing based on the synchronous signal Vsync_in even if the synchronous signal Vsync_in is acquired. In addition, in a case where the sensor 200 functioning as the synchronous master acquires the synchronous signal Vsync_in, the sensor 200 may transmit data indicating an error to the processor 100.

In a case where one of the plurality of sensors 200 included in the control system of the present embodiment functions as the synchronous master (i.e., in a case where the control system of the present embodiment is the control system of the first embodiment), the signal line through which the synchronous signal Vsync_out is output and the signal line through which the synchronous signal Vsync_in is input may be the same signal line, or different signal lines.

For example, the sensor 200 includes an imaging unit 202 and a control unit 204. The sensor 200 is driven by power supplied from an internal power supply (not depicted), such as a battery, constituting the control system 1000, or power supplied from an external power supply outside the control system 1000.

The imaging unit 202 performs imaging, and outputs images via the data bus. For example, the imaging unit 202 includes a pixel array 206, and a pixel reading control circuit 208. For example, the imaging unit 202 further includes an optical system (not depicted) including a single or two or more lenses such as object lens, zoom lens, and focus lens, and an optical element such as a mirror.

For example, the pixel array 206 includes imaging elements corresponding to pixels disposed in matrix. A pixel circuit including a switching element such as an FET (Field Effect Transistor) is connected to each of the imaging elements. Operation of the pixel circuit is controlled by the pixel reading control circuit 208. Examples of each of the imaging elements include a CMOS (Complementary Metal Oxide Semiconductor), and a CCD (Charge Coupled Device).

The pixel reading control circuit 208 reads an image signal corresponding to imaging from each of the imaging elements constituting the pixel array 206. The pixel reading control circuit 208 applies, to the pixel array 206, a control signal for controlling operation of the pixel circuit constituting the pixel array 206 to read the image signal. For example, the pixel reading control circuit 208 is a driver circuit.

The control unit 204 has a function of controlling operation of the sensor 200. Processing performed by the control unit 204 is achieved chiefly by a single or two or more processors (not depicted) each including an arithmetic circuit such as an MPU.

In addition, the control unit 204 includes a register 210, a Vsync generation circuit 212, a retention circuit 214, and a mask circuit 216, for example.

Each of the retention circuit 214 and the mask circuit 216 herein is an example of a constituent element used to achieve the function of the sensor 200 as the synchronous master. Accordingly, in a case where the sensor 200 is configured to function only as the synchronous slave, the sensor 200 need not include the retention circuit 214 and the mask circuit 216.

The register 210 is a single recording medium included in the control unit 204. For example, the register 210 stores setting information. The control unit 204 operates in accordance with setting information stored in the register 210.

For example, the Vsync generation circuit 212 includes a signal generator (not depicted) for generating the synchronous signal Vsync, and a counter (hereinafter referred to as a "Vsync generation counter" in some cases). Operation performed by the Vsync generation circuit 212 varies in accordance with the function performed by the sensor 200.

In a case where the sensor 200 functions as the synchronous master, for example, the Vsync generation circuit 212 measures generation timing of the synchronous signal Vsync using the counter, and generates the synchronous signal Vsync for each generation timing. For example, the Vsync generation circuit 212 measures generation timing of the synchronous signal Vsync on the basis of an image size indicated by the setting information stored in the register 210.

In a case where the sensor 200 functions as the synchronous master, the synchronous signal Vsync generated by the Vsync generation circuit 212 is used for control of imaging by the imaging unit 202 included in the sensor 200, and control of imaging by the different sensor 200 functioning as the synchronous slave. In other words, in a case where the sensor 200 functions as the synchronous master, the control unit 204 performs a function of controlling each of imaging by the imaging unit 202, and imaging by the different sensor 200 functioning as the synchronous slave.

In addition, in a case where the sensor 200 functions as the synchronous slave, for example, the Vsync generation circuit 212 generates the synchronous signal Vsync for controlling imaging by the imaging unit 202 included in the sensor 200 by using the synchronous signal Vsync_in acquired from the external device functioning as the synchronous master. As described above, the external device functioning as the synchronous master is the different sensor 200 (in case of control system 1000 of the first embodiment), or the processor 100 (in case of control system 1000 of the second embodiment), for example. The Vsync generation circuit 212 generates the synchronous signal Vsync every time the synchronous signal Vsync_in output from the external device functioning as the synchronous master is acquired. The synchronous signal Vsync_in output from the external device functioning as the synchronous master corresponds to the synchronous slave synchronous signal.

Accordingly, in a case where the sensor 200 functions as the synchronous slave, the control unit 204 performs a function of controlling imaging by the imaging unit 202 on the basis of the synchronous slave synchronous signal acquired from the external device functioning as the synchronous master.

The retention circuit 214, which is another recording medium included in the control unit 204, retains an acquisition state of a stop request (example of processing request). Examples of the retention circuit 214 include any circuits capable of retaining a state of acquisition of a stop request, such as a latch circuit. For example, operations performed by the retention circuit 214, such as retention of the stop request acquisition state of the retention circuit 214, and reset of the retention circuit 214, are controlled by a processor (not depicted) constituting the control unit 204.

The mask circuit 216 selectively outputs the synchronous signal Vsync generated by the Vsync generation circuit 212 to the signal line connected to the different sensor 200 functioning as the synchronous slave in accordance with the stop request acquisition state retained in the retention circuit 214.

In a case where the acquisition state of the retention circuit 214 does not indicate acquisition of a stop request, for example, the mask circuit 216 outputs the synchronous signal Vsync generated by the Vsync generation circuit 212. The synchronous signal Vsync output from the mask circuit 216 corresponds to the synchronous signal Vsync_out, i.e., the synchronous slave synchronous signal for controlling imaging timing of the different sensor 200 functioning as the synchronous slave.

In addition, in a case where the acquisition state of the retention circuit 214 indicates acquisition of a stop request, for example, the mask circuit 216 does not output the synchronous signal Vsync generated by the Vsync generation circuit 212.

For example, the mask circuit 216 is "any circuit capable of selectively outputting the synchronous signal Vsync generated by the Vsync generation circuit 212 in accordance with the stop request acquisition state of the retention circuit 214," such as an AND circuit.

For example, the sensor 200 has a configuration depicted in FIG. 2. For example, the sensor 200 having the configuration depicted in FIG. 2 operates as the synchronous master or the synchronous slave based on setting information.

Note that the configuration of the sensor 200 is not limited to the example depicted in FIG. 2.

For example, in a case where the sensor 200 is configured to function only as the synchronous slave, the sensor 200 need not include the retention circuit 214 and the mask circuit 216 as described above.

[1-1-3] Memory 300

The memory 300 is a recording medium included in the control system 1000. For example, the memory 300 is a volatile memory such as a RAM (Random Access Memory), or a non-volatile memory such as a flash memory.

For example, images output from the respective sensors 200 are stored in the memory 300. For example, image recording in the memory 300 is controlled by the processor 100.

[1-1-4] Display Device 400

The display device 400 is a display device included in the control system 1000. For example, the display device 400 is a liquid crystal display, or an organic EL display (Organic Electro-Luminescence Display, or also called an OLED display (Organic Light Emitting Diode Display) as well).

For example, various images and screens, such as images output from the respective sensors 200, screens associated with applications executed by the processor 100, and screens associated with an UI (User Interface), are displayed on a display screen of the display device 400. For example, display of images and the like on the display screen of the display device 400 is controlled by the processor 100.

[1-2] Second Configuration Example of Control System of Present Embodiment

Figure 3:
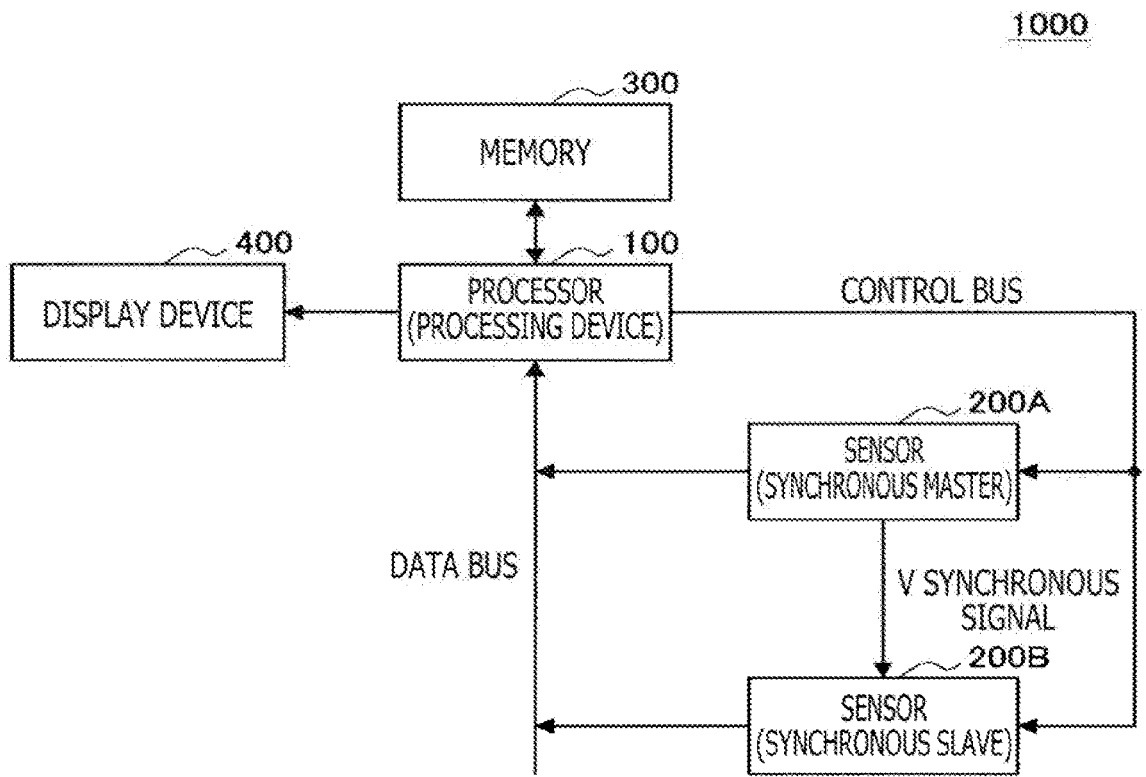
FIG. 3 is an explanatory diagram depicting a second configuration example of the control system according to the present embodiment.

FIG. 3 is an explanatory view depicting a second configuration example of the control system 1000 according to the present embodiment, presenting another example of a configuration of the control system of the first embodiment which includes a plurality of image sensors one of which functions as the synchronous master.

For example, the control system 1000 according to the second configuration example includes the processor 100, the plurality of sensors 200A and 200B, the memory 300, and the display device 400. FIG. 3 depicts an example of a sensor 200A functioning as the synchronous master, and a sensor 200B functioning as the synchronous slave. Note that the function performed by each of the sensors 200 of the control system 1000 is variable in accordance with setting information as described above.

The control system 1000 according to the second configuration example depicted in FIG. 3 and the control system 1000 according to the first configuration example depicted in FIG. 1 are different, when compared with each other, in that the data bus of the control system 1000 depicted in FIG. 3 is shared by the plurality of sensors 200 unlike the control system 1000 depicted in FIG. 1. The control system 1000 depicted in FIG. 3 and the control system 1000 depicted in FIG. 1 are identical to each other in other points.

[1-3] Third Configuration Example of Control System of Present Embodiment

Figure 4:
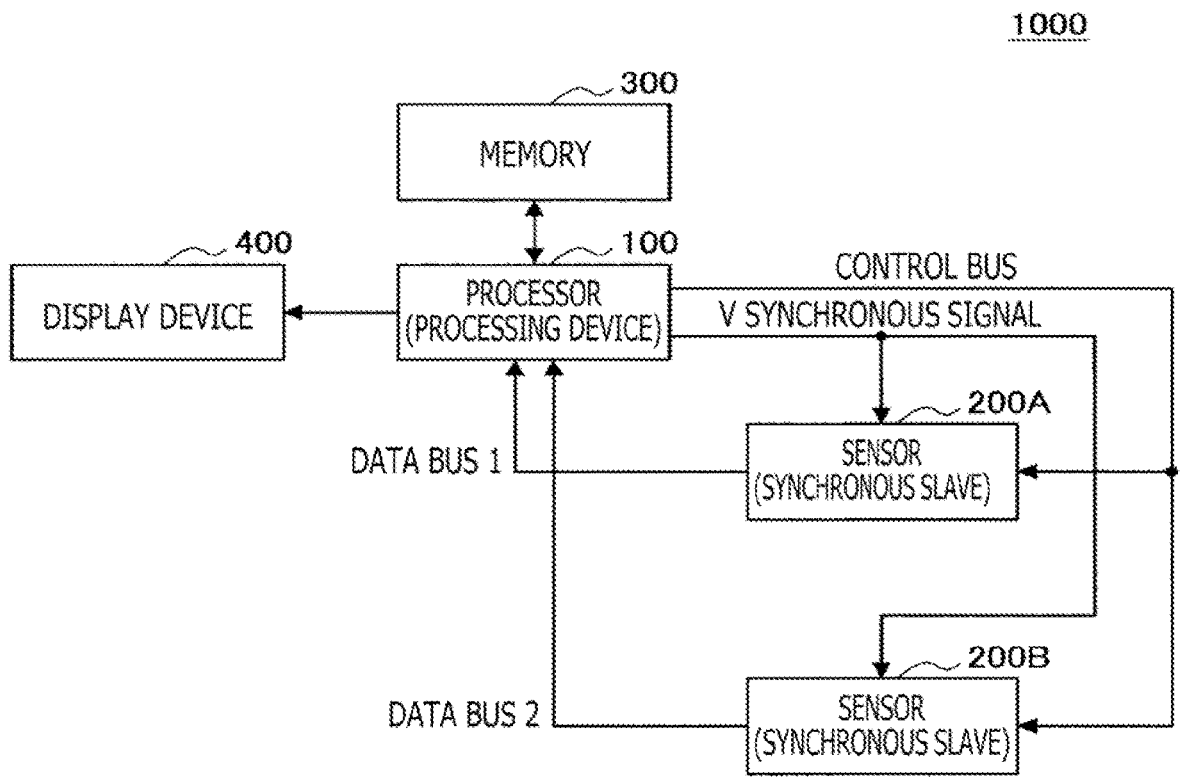
FIG. 4 is an explanatory diagram depicting a third configuration example of the control system according to the present embodiment.

FIG. 4 is an explanatory view depicting a third configuration example of the control system 1000 of the present embodiment, presenting an example of the configuration of the control system according to the second embodiment which includes the processor functioning as the synchronous master.

For example, the control system 1000 according to the third configuration example includes the processor 100, the plurality of sensors 200A and 200B, the memory 300, and the display device 400. FIG. 4 depicts an example of the sensor 200A and the sensor 200B each functioning as the synchronous slave. Note that the function performed by each of the sensors 200 of the control system 1000 is variable in accordance with setting information as described above. More specifically, the control system 1000 of the present embodiment may be switched between the control system 1000 of the second embodiment and the control system 1000 of the first embodiment in accordance with a setting made by the processor 100 concerning the functions of the respective sensors 200.

The control system 1000 according to the third configuration example depicted in FIG. 4 and the control system 1000 according to the first configuration example depicted in FIG. 1 are different, when compared with each other, in that "all the sensors 200 constituting the control system 1000 function as the synchronous slave" in the control system 1000 depicted in FIG. 4, and that "the processor 100 and the respective sensors 200 are electrically connected via a signal line different from the data bus and the control bus," unlike the control system 1000 depicted in FIG. 1. The processor 100 transmits a synchronous slave synchronous signal to the respective sensors 200 via the signal line. The control system 1000 depicted in FIG. 4 and the control system 1000 depicted in FIG. 1 are identical to each other in other points.

[1-4] Fourth Configuration Example of Control System of Present Embodiment

Figure 5:
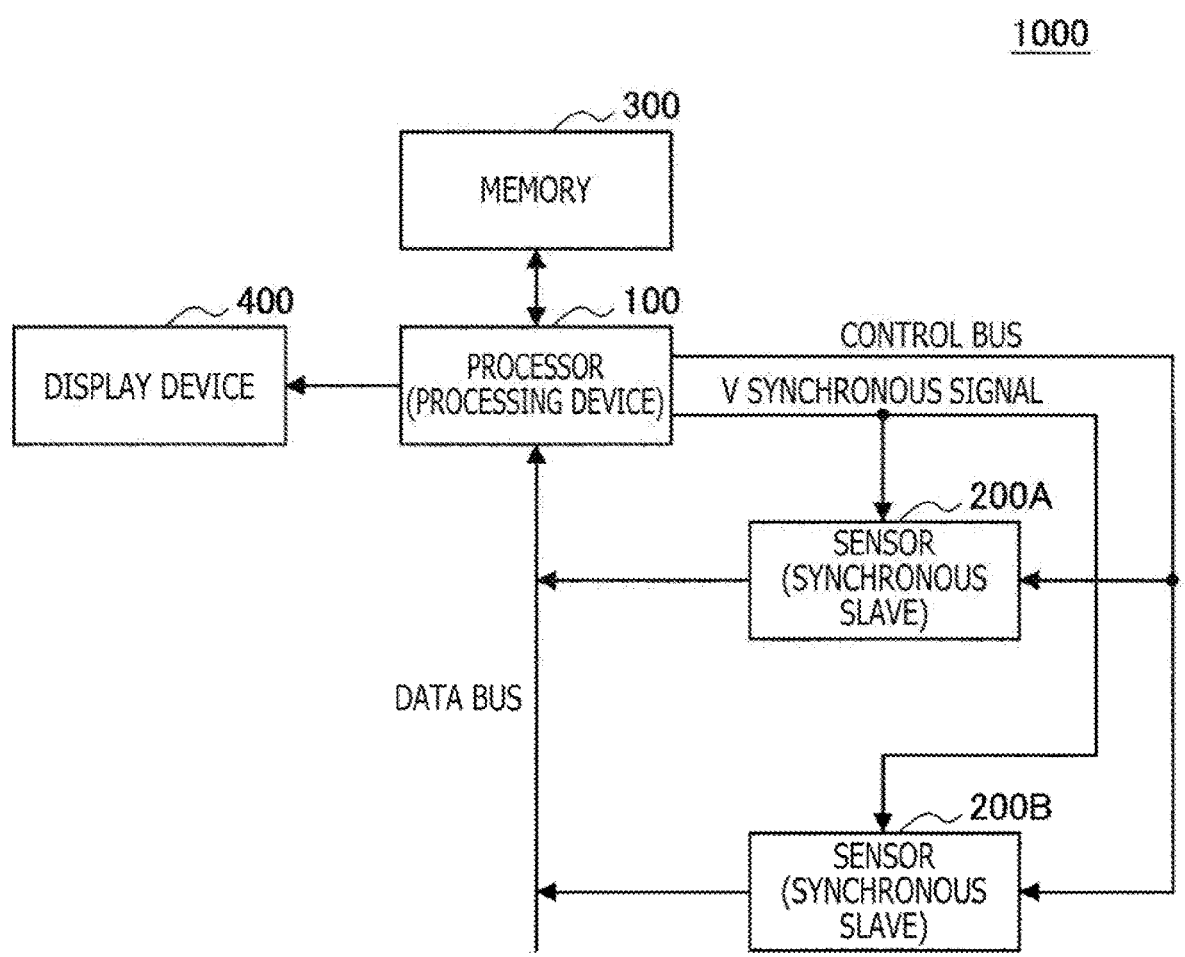
FIG. 5 is an explanatory diagram depicting a fourth configuration example of the control system according to the present embodiment.

FIG. 5 is an explanatory view depicting a fourth configuration example of the control system 1000 of the present embodiment, presenting another example of the configuration of the control system according to the second embodiment which includes the processor functioning as the synchronous master.

For example, the control system 1000 according to the fourth configuration example includes the processor 100, the plurality of sensors 200A and 200B, the memory 300, and the display device 400. FIG. 5 depicts an example of the sensor 200A and the sensor 200B each functioning as the synchronous slave. Note that the function performed by each of the sensors 200 of the control system 1000 is variable in accordance with setting information as described above.

The control system 1000 according to the fourth configuration example depicted in FIG. 5 and the control system 1000 according to the third configuration example depicted in FIG. 4 are different, when compared with each other, in that the data bus of the control system 1000 depicted in FIG. 5 is shared by the plurality of sensors 200, unlike the control system 1000 depicted in FIG. 4. The control system 1000 depicted in FIG. 5 and the control system 1000 depicted in FIG. 4 are identical to each other in other points.

[1-5] Other Configuration Examples of Control System of Present Embodiment

For example, the control system 1000 has any one of the configurations depicted in FIGS. 1, 3, 4, and 5. Note that the configuration of the control system of the present embodiment is not limited to the examples depicted in FIGS. 1, 3, 4, and 5.

In a case where the images output from the plurality of sensors 200 are stored in an external recording medium outside the control system of the present embodiment, or in a case where the images output from the plurality of sensors 200 are stored in a recording medium included in the processor 100, for example, the control system of the present embodiment need not include the memory 300 depicted in each of FIGS. 1, 3, 4, and 5.

Moreover, the control system of the present embodiment may have a configuration not including the display device 400 depicted in each of FIGS. 1, 3, 4, and 5.

Furthermore, the control system of the present embodiment may have any configuration corresponding to functions of an electronic equipment described below as an equipment to which the control system of the present embodiment is applied.

[2] Possible Problems Arising from System Including Plural Image Sensors

Before explaining a method for achieving a synchronous stop of imaging operation performed by a plurality of image sensors in the control system of the present embodiment (control method according to the present embodiment), described initially are possible problems arising from a synchronous stop of imaging operation performed by a plurality of image sensors in a system including the plurality of image sensors.

As described above, a method of broadcasting a stop request from a processor via a control bus is one example method for stopping imaging operation performed by a plurality of image sensors in a system including a plurality of image sensors, such as an electronic equipment including a plurality of image sensors.

However, as described above, a synchronous stop of imaging operation performed by all image sensors may be difficult to achieve in response to the stop request in a case where the stop request is broadcasted via the control bus.

Figure 6:
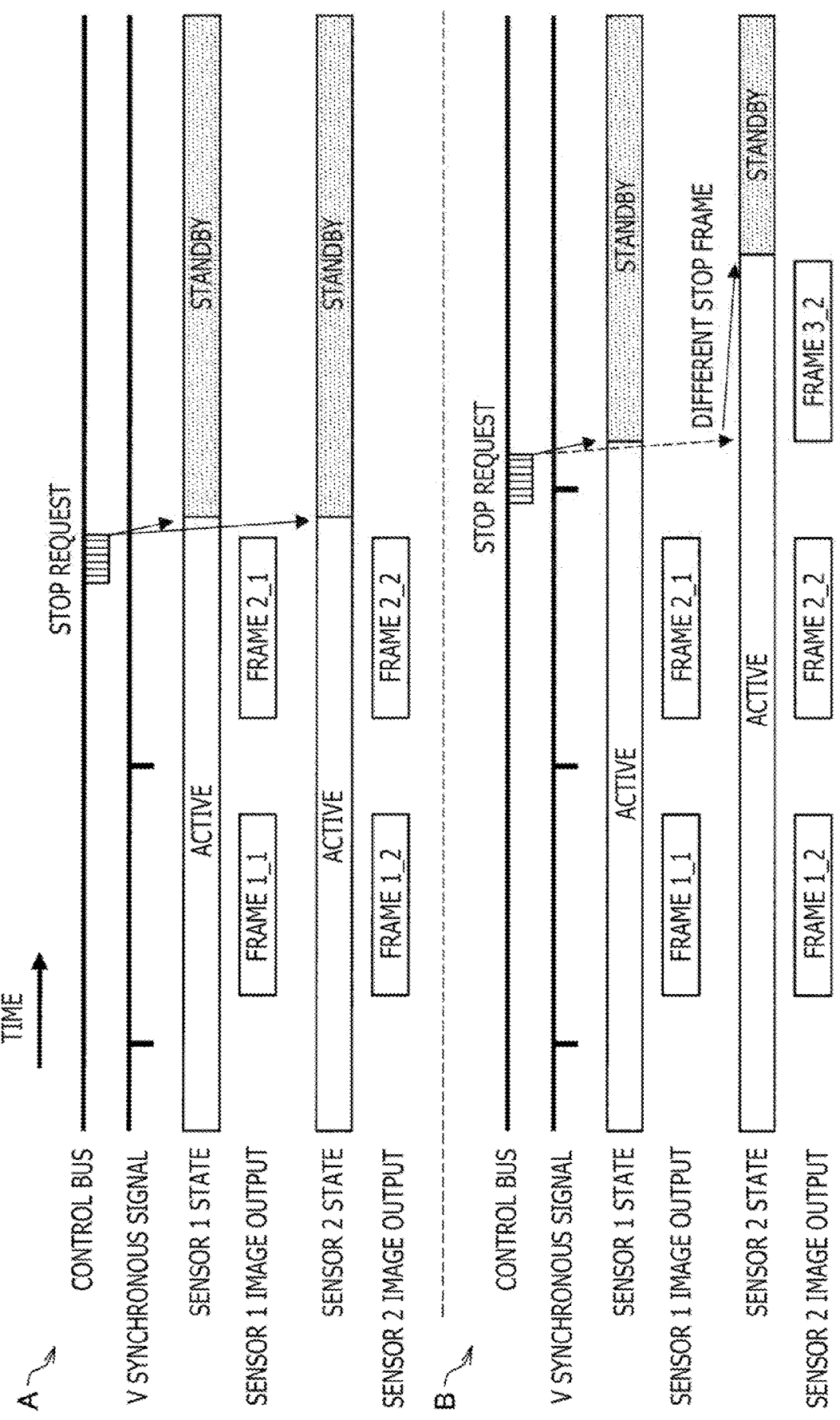
FIG. 6 is an explanatory diagram explaining a problem which may arise from a system including a plurality of image sensors.

FIG. 6 is an explanatory diagram explaining problems which may arise from a system including a plurality of image sensors. FIG. 6 depicts a system which includes two image sensors constituted by a sensor 1 and a sensor 2.

Each of a "sensor 1 state" and a "sensor 2 state" depicted in FIG. 6 indicates a state of imaging operation performed by the corresponding image sensor. "Active" depicted in FIG. 6 indicates a state where the image sensor does not stop imaging operation, i.e., a state where imaging is allowed (applicable to other figures). On the other hand, "standby" depicted in FIG. 6 indicates a state where the imaging sensor stops imaging operation (applicable to other figures). For example, the stop state of imaging operation according to the present embodiment is a standby state of the image sensor.

"Sensor 1 image output" depicted in FIG. 6 indicates an image output from the image sensor corresponding to the sensor 1, while "sensor 2 image output" indicates an image output from the image sensor corresponding to the sensor 2 (applicable to other figures). Each of the image sensors outputs an image on the basis of a synchronous signal indicated as "V synchronous signal" in FIG. 6. An image output from the image sensor on the basis of the synchronous signal corresponds to a frame image associated with a frame (applicable to other figures).

A part A in FIG. 6 depicts an example where all the image sensors synchronously stop imaging operation in response to a stop request broadcasted from the processor via the control bus. A part B in FIG. 6 depicts an example where not all the image sensors synchronously stop imaging operation in response to a stop request broadcasted from the processor via the control bus.

In a case where a stop request is broadcasted from the processor via the control bus, each of the plurality of image sensors stops imaging operation in response to the acquired stop request.

Accordingly, in a case where a stop request is broadcasted via the control bus, the plurality of image sensors can synchronously stop imaging operation as depicted in part A in FIG. 6.

Generally, each of the image sensors herein stops imaging operation after completion of output of an image "in a case where a stop request is acquired after a start of output of the image and before completion of output of the image. The image sensor stops imaging operation as described above to prevent output of an incomplete image, for example.

However, in a case where a stop request is broadcasted via the control bus immediately before a start of output of an image from the image sensor, for example, acquisition timing of the stop request may be different for each of the image sensors for following reasons, for example.

Synchronous skew between the image sensors
   Acquisition phase difference (deviation) between respective image sensors in acquiring a signal indicating control information, which difference is produced by fluctuations of jitters of an operation clock included in each of the image sensors Moreover, in a case where acquisition timing of the stop request is different for each image sensor, an operation stop frame where imaging operation stops is different for each image sensor as depicted in part B in FIG. 6, for example. More specifically, in a case where a stop request is broadcasted via the control bus, all the image sensors do not necessarily stop imaging operation in an identical frame as depicted in part B in FIG. 6, for example.

[3] Method for Synchronous Stop of Imaging Operation Performed by Plural Image Sensors in Control System of Present Embodiment (Control Method of Present Embodiment)

Described next is a method for synchronous stop of imaging operation performed by a plurality of image sensors in the control system of the present embodiment.

[3-1] Method for Synchronous Stop of Imaging Operation Performed by Plural Image Sensors in the Control System of First Embodiment Initially described is a method for synchronous stop of imaging operation performed by a plurality of image sensors in the "control system of the first embodiment where one of the plurality of image sensors functions as the synchronous master" as depicted in FIGS. 1 and 3.

Figure 7:
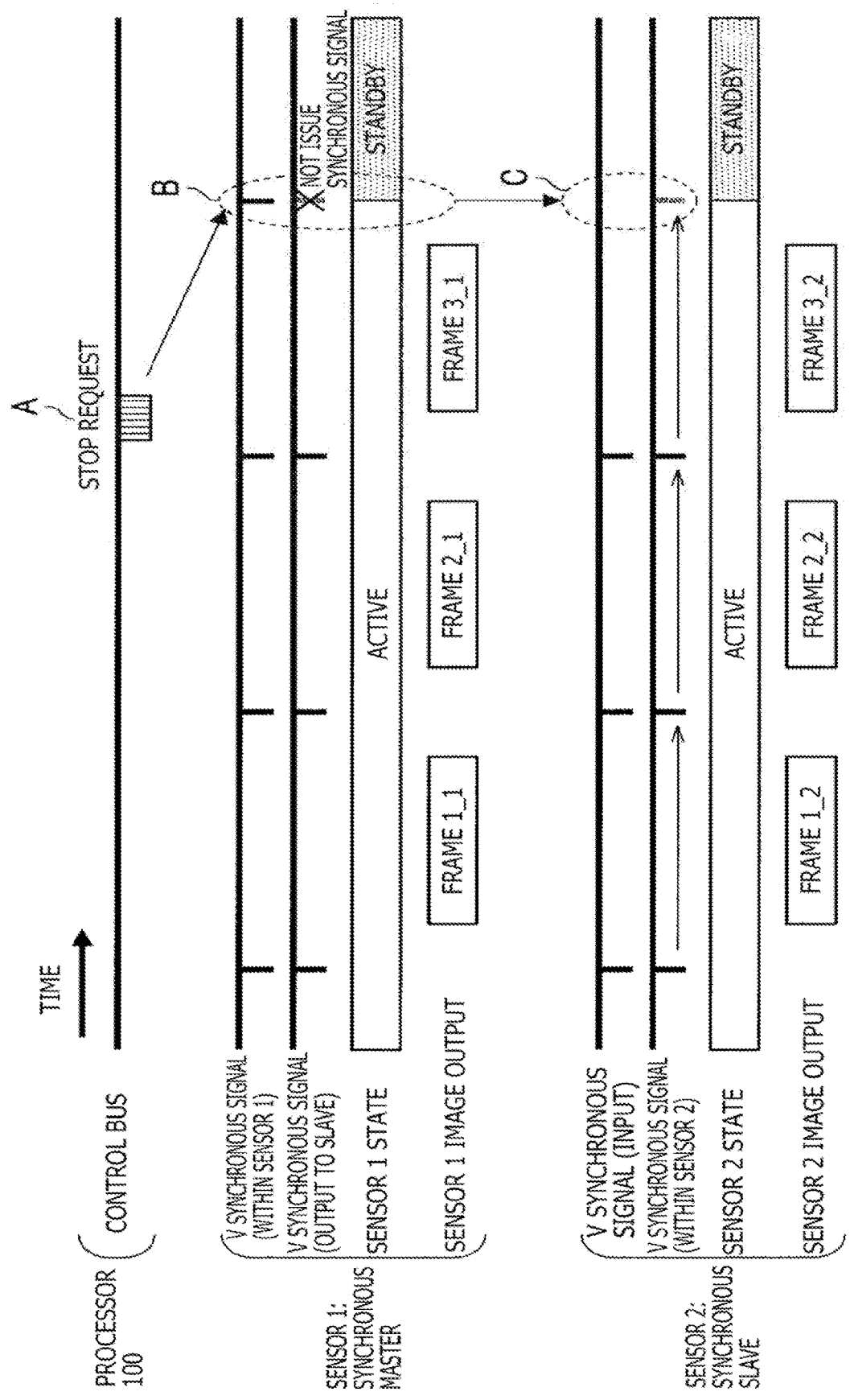
FIG. 7 is an explanatory diagram explaining a method for achieving a synchronous stop of imaging operation performed by a plurality of image sensors of a control system according to a first embodiment.

FIG. 7 is an explanatory diagram explaining a method for a synchronous stop of imaging operation performed by the plurality of image sensors in the control system according to the first embodiment.

As described above, the control system of the first embodiment includes the processor 100 and the plurality of sensors 200. According to the control system 1000 of the first embodiment, one of the plurality of sensors 200 functions as the synchronous master. FIG. 7 depicts an example of the sensor 200 indicated as the sensor 1 and functioning as the synchronous master, and the sensor 200 indicated as the sensor 2 and functioning as the synchronous slave.

According to the control system 1000 of the first embodiment, synchronous imaging operation is implemented by the plurality of sensors 200 in a following manner, for example.

The sensor 200 functioning as the synchronous master
   transmits a synchronous signal (synchronous slave synchronous signal) to the sensor 200 functioning as the synchronous slave.

The sensor 200 functioning as the synchronous slave performs imaging operation in accordance with the synchronous signal (synchronous slave synchronous signal) transmitted from the sensor 200 functioning as the synchronous master.

In addition, in case of the control system 1000 of the first embodiment, a synchronous stop of imaging operation performed by the plurality of sensors 200 is implemented in manners (A) to (C) described below, for example.

(A) A in FIG. 7

The processor 100 transmits a stop request only to the sensor 200 functioning as the synchronous master via the control bus.

For example, the stop request according to the present embodiment is a processing command for updating information indicating an imaging operation state stored in the register 210 included in the sensor 200 to information indicating an imaging operation stop. In addition, for example, the information indicating the imaging operation state according to the present embodiment is "a flag indicating execution of imaging operation or stop of imaging operation."

Hereinafter described is an example where the imaging operation performed by the sensor 200 is controlled on the basis of information indicating the imaging operation state stored in the register 210. In addition, the stop request according to the present embodiment is referred to as "operation register Off" in some cases.

Needless to say, the imaging operation performed by the sensor 200 is not limited to operation controlled on the basis of information indicating the imaging operation state stored in the register 210. The information indicating the imaging operation state according to the present embodiment is not limited to the example described above. The stop request according to the present embodiment is not limited to the example described above.

More specifically, for example, the processor 100 transmits control information which includes both identification information indicating the sensor 200 functioning as the synchronous master and a stop request to transmit a stop request only to the sensor 200 functioning as the synchronous master. Needless to say, the method of transmitting a stop request only to the sensor 200 functioning as the synchronous master is not limited to the example described above.

(B) B in FIG. 7

The sensor 200 functioning as the synchronous master retains a stop request acquired via the control bus, and stops imaging operation in synchronization with the synchronous signal Vsync generated by the Vsync generation circuit 212.

In addition, the sensor 200 functioning as the synchronous master does not transmit a synchronous signal, which is a signal generated to be transmitted to the sensor 200 functioning as the synchronous slave, to the sensor 200 functioning as the synchronous slave. For example, the foregoing "synchronous signal transmitted from the sensor 200 functioning as the synchronous master to the sensor 200 functioning as the synchronous slave" is the synchronous signal Vsync generated by the Vsync generation circuit 212.

As described above, the sensor 200 functioning as the synchronous master achieves, by operations of the retention circuit 214 and the mask circuit 216, selective transmission of the synchronous signal output to the sensor 200 functioning as the synchronous slave.

(C) C in FIG. 7

The sensor 200 functioning as the synchronous slave stops imaging operation in a case where acquisition of the synchronous signal from the sensor 200 functioning as the synchronous master is not determined within a reception expected period of this synchronous signal.

For example, the sensor 200 functioning as the synchronous slave determines acquisition of the synchronous signal when a synchronous pulse (edge) of the synchronous signal is detected. For example, the sensor 2 depicted in FIG. 7 (sensor 200 functioning as the synchronous slave) determines acquisition of the synchronous signal in a case where a falling edge indicated as "V synchronous signal (input)" in FIG. 7 is detected.

Note that the sensor 200 functioning as the synchronous slave may determine acquisition of the synchronous signal by a method other than the method described by way of example. For example, the sensor 200 functioning as the synchronous slave may determine acquisition of the synchronous signal in a case where a rising edge of the synchronous signal is detected. Alternatively, for example, the sensor 200 functioning as the synchronous slave may determine acquisition of the synchronous signal in a case where a predetermined signal pattern is detected.

For example, the sensor 200 functioning as the synchronous slave does not determine acquisition of the synchronous signal within the reception expected period of the synchronous signal "in a case where the next synchronous signal is not acquired before an elapse of a set predetermined period from acquisition of the synchronous signal from the sensor 200 functioning as the synchronous master." In addition, for example, the sensor 200 functioning as the synchronous slave determines acquisition of the synchronous signal within the reception expected period of the synchronous signal "in a case where the next synchronous signal is acquired before an elapse of the set predetermined period from acquisition of the synchronous signal from the sensor 200 functioning as the synchronous master."

The predetermined period of the present embodiment herein is a period longer than a time interval for transmitting the synchronous signal (synchronous slave synchronous signal) from the external device functioning as the synchronous master.

For example, the sensor 200 functioning as the synchronous slave specifies the time interval for transmitting the synchronous signal from the external device functioning as the synchronous master on the basis of an image size (frame size) indicated by setting information stored in the register 210. Subsequently, the sensor 200 functioning as the synchronous slave sets the predetermined period to a period longer than the specified time interval, and determines whether or not the next synchronous signal has been acquired before an elapse of the predetermined period.

According to the control system 1000 of the first embodiment, the plurality of sensors 200 stop imaging operation as in the manners (A) to (C) described above, for example.

For example, as in (B) described above, the sensor 200 constituting the control system of the first embodiment and functioning as the synchronous master herein stops imaging operation on the basis of acquisition of a stop request, and does not output the synchronous signal to the sensor 200 functioning as the synchronous slave.

In addition, the sensor 200 constituting the control system of the first embodiment and functioning as the synchronous slave stops imaging operation "in a case where the next synchronous signal is not acquired before an elapse of the set predetermined period from acquisition of the synchronous signal from the sensor 200 functioning as the synchronous master." In other words, the sensor 200 constituting the control system of the first embodiment and functioning as the synchronous slave considers, as a stop request, the state that the synchronous signal has not been acquired from the sensor 200 functioning as the synchronous master within the predetermined period, and stops imaging operation. In this case, the sensor 200 constituting the control system of the first embodiment and functioning as the synchronous slave can stop imaging operation not on the basis of acquisition of the stop request, but on the basis of determination of whether or not the synchronous signal has been acquired from the apparatus functioning as the synchronous master within the predetermined period.

Accordingly, the control system 1000 of the first embodiment can implement a synchronous stop of imaging operation performed by the plurality of sensors 200.

Operation of the sensors 200 constituting the control system of the first embodiment is hereinafter described more specifically.

Figure 8:
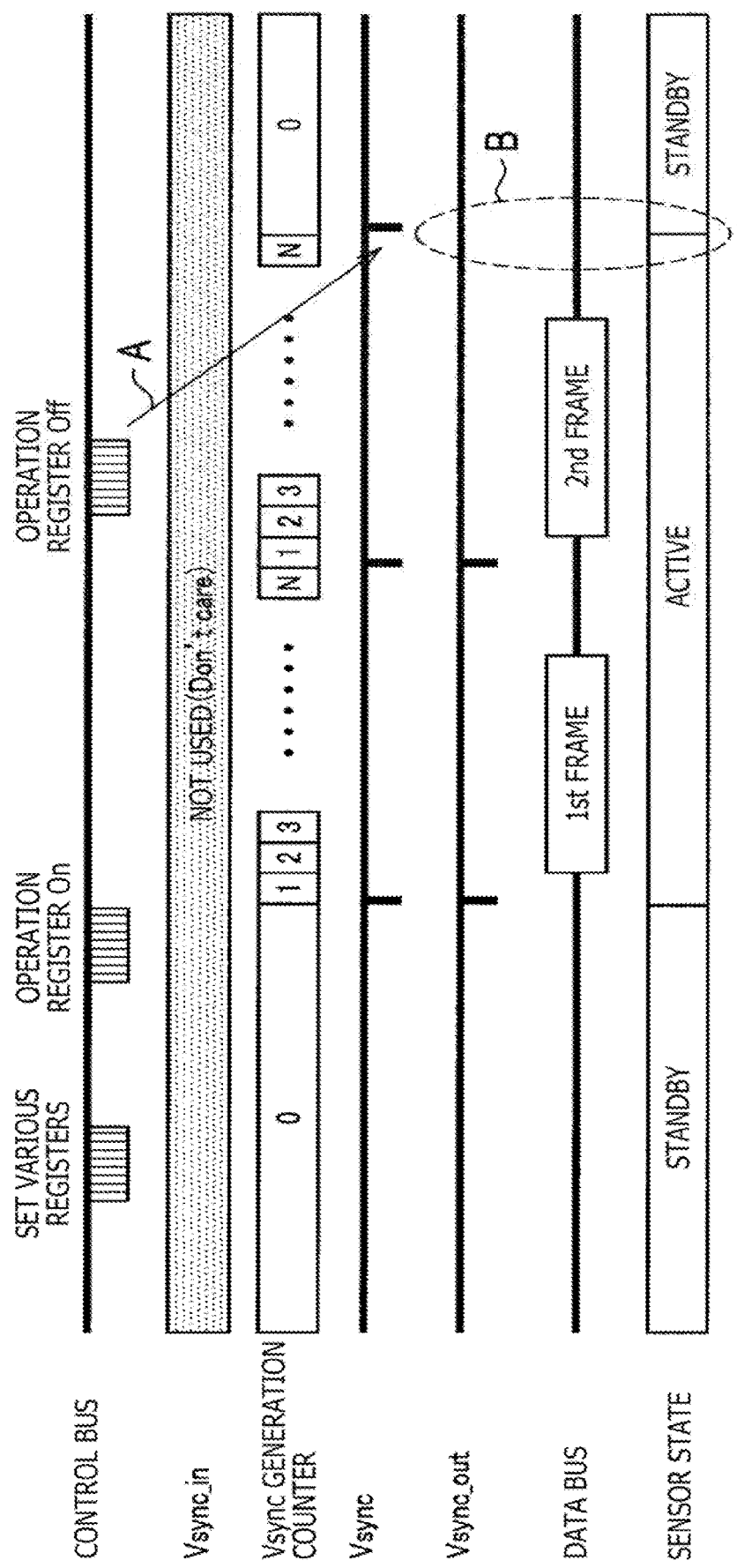
FIG. 8 is an explanatory diagram depicting an example of operation of a sensor functioning as a synchronous master according to the first embodiment.

[3-1-1] Operation of Sensor 200 Functioning as Synchronous Master of First Embodiment FIG. 8 is an explanatory diagram depicting an example of operation of the sensor 200 functioning as a synchronous master according to the first embodiment. FIG. 8 depicts an example of operation of the sensor 200 functioning as the synchronous master in a case where the sensor 200 has the configuration depicted in FIG. 2. An example of the operation of the sensor 200 functioning as the synchronous master is hereinafter described while touching upon the configuration of the sensor 200 depicted in FIG. 2 as necessary.

When an imaging start request is acquired via the control bus, the sensor 200 starts generation of the synchronous signal Vsync using the Vsync generation circuit 212 to start imaging operation.

For example, the start request of the present embodiment is a processing command for updating information indicating an imaging operation state stored in the register 210 included in the sensor 200 to information indicating an imaging operation start. The start request of the present embodiment is hereinafter referred to as "operation register On" in some cases.

The Vsync generation circuit 212 measures generation timing of the synchronous signal Vsync using the Vsync generation counter, and generates the synchronous signal Vsync for each generation timing. According to the example depicted in FIG. 8, the synchronous signal Vsync is generated every time a value of the Vsync generation counter becomes N (N: 1 or larger integer), and the value of the Vsync generation counter is reset to an initial value every time the synchronous signal Vsync is generated. For example, the value N is set in accordance with an image size (frame size) indicated by setting information stored in the register 210.

The control unit 204 of the sensor 200 causes the imaging unit 202 to perform imaging on the basis of the generated synchronous signal Vsync. For example, the control unit 204 transmits the generated synchronous signal Vsync to the imaging unit 202 to allow imaging by the imaging unit 202.

The control unit 204 also outputs the synchronous signal (synchronous slave synchronous signal) based on the generated synchronous signal Vsync to the sensor 200 functioning as the synchronous slave. The sensor 200 having the configuration depicted in FIG. 2 transmits, by operations of the retention circuit 214 and the mask circuit 216, the synchronous signal Vsync generated by the Vsync generation circuit 212 via the signal line connected to the sensor 200 functioning as the synchronous slave to output the synchronous signal to the sensor 200 functioning as the synchronous slave.

The sensor 200 performs the above operations, for example, to control both imaging by the imaging unit 202 and imaging by the different sensor 200.

When a stop request is acquired via the control bus, the sensor 200 retains a stop request acquisition state using the retention circuit 214 (A in FIG. 8). For example, the retention circuit 214 may retain the stop request acquisition state by retaining the acquired stop request, or may retain the stop request acquisition state by retaining a value indicating the stop request.

For example, the retention circuit 214 retains the stop request acquisition state until the Vsync generation circuit 212 generates the next synchronous signal Vsync after acquisition of the current stop request.

In a case where the next synchronous signal Vsync is generated with the stop request acquisition state retained in the retention circuit 214, the control unit 204 stops imaging operation performed by the imaging unit 202 (B in FIG. 8). For example, the control unit 204 does not transmit the generated synchronous signal Vsync to the imaging unit 202 to stop imaging operation performed by the imaging unit 202. In addition, the control unit 204 may shift the whole sensor 200 into a set standby condition after imaging operation by the imaging unit 202 is stopped.

Moreover, in a case where the next synchronous signal Vsync is generated with the stop request acquisition state retained in the retention circuit 214, the control unit 204 does not output the synchronous signal Vsync to the sensor 200 functioning as the synchronous slave by operations of the retention circuit 214 and the mask circuit 216 (B in FIG. 8).

The sensor 200 functioning as the synchronous master implements "a stop of imaging operation based on the stop request acquisition, and no output of the synchronous signal to the sensor 200 functioning as the synchronous slave" by performing the operations depicted in FIG. 8, for example.

Figure 9:
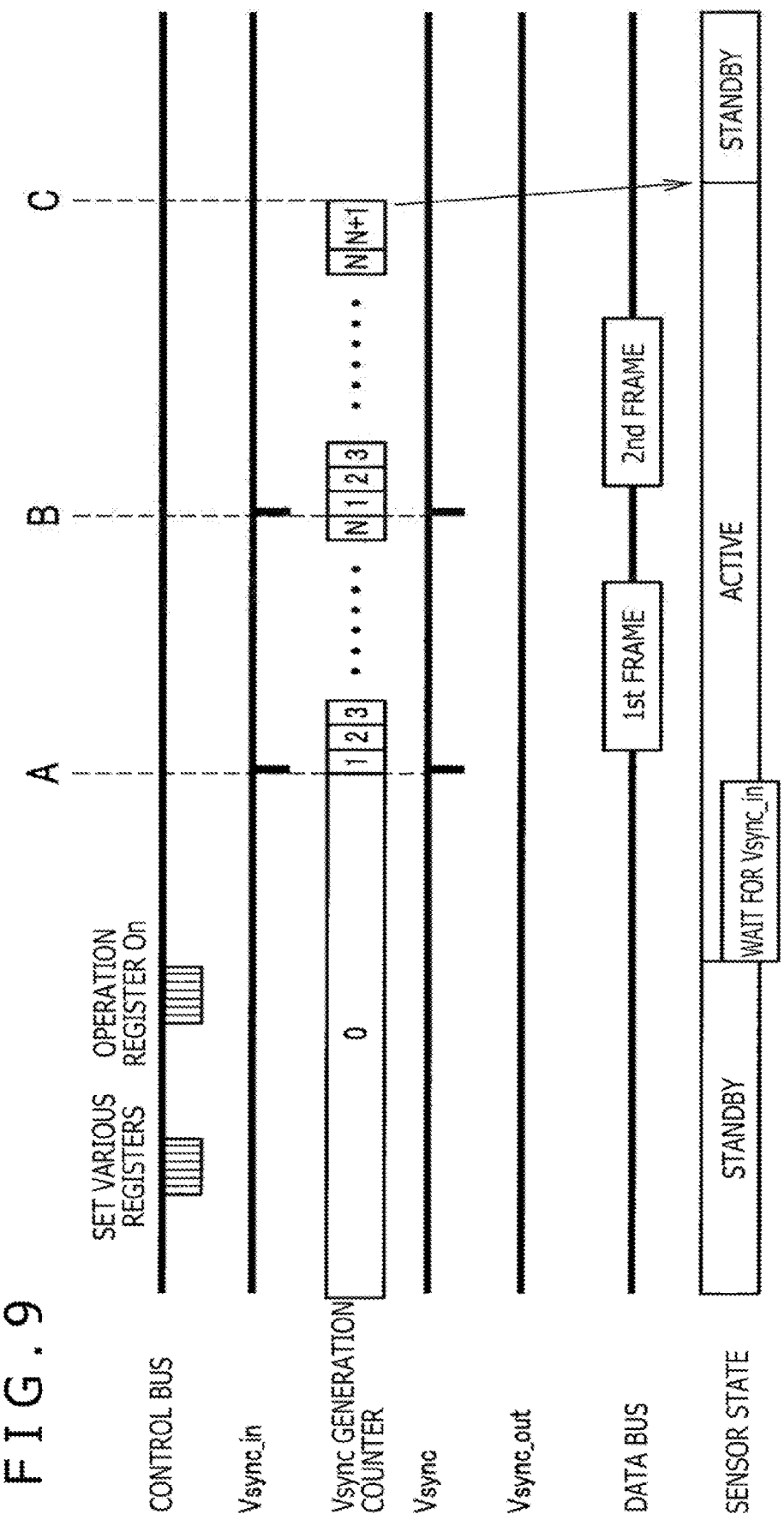
FIG. 9 is an explanatory diagram depicting an example of operation of a sensor functioning as a synchronous slave according to the first embodiment.

[3-1-2] Operation of Sensor 200 Functioning as the Synchronous Slave of First Embodiment FIG. 9 is an explanatory diagram depicting an example of operation of the sensor 200 functioning as the synchronous slave according to the first embodiment. FIG. 9 depicts an example of operation of the sensor 200 functioning as the synchronous slave in a case where the sensor 200 has the configuration depicted in FIG. 2. An example of operation of the sensor 200 functioning as the synchronous slave is hereinafter described while touching upon the configuration of the sensor 200 depicted in FIG. 2 as necessary.

When an imaging start request is acquired via the control bus, the control unit 204 of the sensor 200 waits for reception of a synchronous signal from the external device.

When a synchronous signal is acquired via the signal line connected to the sensor 200 functioning as the synchronous master, for example, the Vsync generation circuit 212 starts generation of the synchronous signal Vsync to start imaging operation (A in FIG. 9).

The control unit 204 resets a value of the Vsync generation counter of the Vsync generation circuit 212 to an initial value on the basis of a trigger of the synchronous signal acquired from the sensor 200 functioning as the synchronous master to start update of the value of the Vsync generation counter. The value of the Vsync generation counter after the start of update indicates a numerical value corresponding to an elapsed time from acquisition of the synchronous signal (synchronous slave synchronous signal) from the external device.

The control unit 204 further determines whether the next synchronous signal has been acquired before an elapse of a predetermined period of the present embodiment by comparing the value of the Vsync generation counter with a threshold corresponding to a time interval of transmission of the synchronous signal from the external device functioning as the synchronous master.

For example, the threshold corresponding to the time interval of the present embodiment herein is set on the basis of an image size (frame size) indicated by setting information stored in the register 210. Assuming that the value indicating the time interval corresponding to the image size indicated by the setting information is N, N+n (n: 1 or larger integer) is set as the threshold corresponding to the time interval. The value n may be a fixed value set beforehand, or a variable value variable in accordance with set information transmitted from the processor 100 via the control bus. In addition, for example, the value n is set in consideration of a delay or the like which may be produced during transmission and reception of the synchronous signal to and from the external device functioning as the synchronous master. FIG. 9 depicts an example that the control unit 204 designates N+1 as the threshold corresponding to the time interval.

The control unit 204 does not determine acquisition of the next synchronous signal before an elapse of the predetermined period in a case where the value of the Vsync generation counter is larger than the threshold corresponding to the time interval, or in a case where the value of the Vsync generation counter is equal to or larger than the threshold corresponding to the time interval.

In a case where the synchronous signal is acquired from the sensor 200 functioning as the synchronous master before determination of "acquisition of the next synchronous signal before an elapse of the predetermined period," the Vsync generation circuit 212 generates the synchronous signal Vsync, and the control unit 204 causes the imaging unit 202 to perform imaging (B in FIG. 9).

The control unit 204 also resets a value of the Vsync generation counter of the Vsync generation circuit 212 to an initial value on the basis of a trigger of the synchronous signal acquired from the sensor 200 functioning as the synchronous master to start update of the value of the Vsync generation counter (B in FIG. 9).

In a case where "acquisition of the next synchronous signal before an elapse of the predetermined period" is not determined, the control unit 204 stops imaging performed by the imaging unit 202 (C in FIG. 9). For example, the control unit 204 stops imaging operation performed by the imaging unit 202 by preventing generation of the synchronous signal Vsync by the Vsync generation circuit 212. In addition, the control unit 204 may shift the whole sensor 200 into a set standby condition after a stop of imaging operation by the imaging unit 202.

The sensor 200 functioning as the synchronous slave implements "a stop of imaging operation considering no acquisition of the synchronous signal from the sensor 200 functioning as the synchronous master within the predetermined period as a stop request" by performing the operations depicted in FIG. 9, for example.

[3-1-3] Operation of Control System 1000 of First Embodiment

Figure 10:
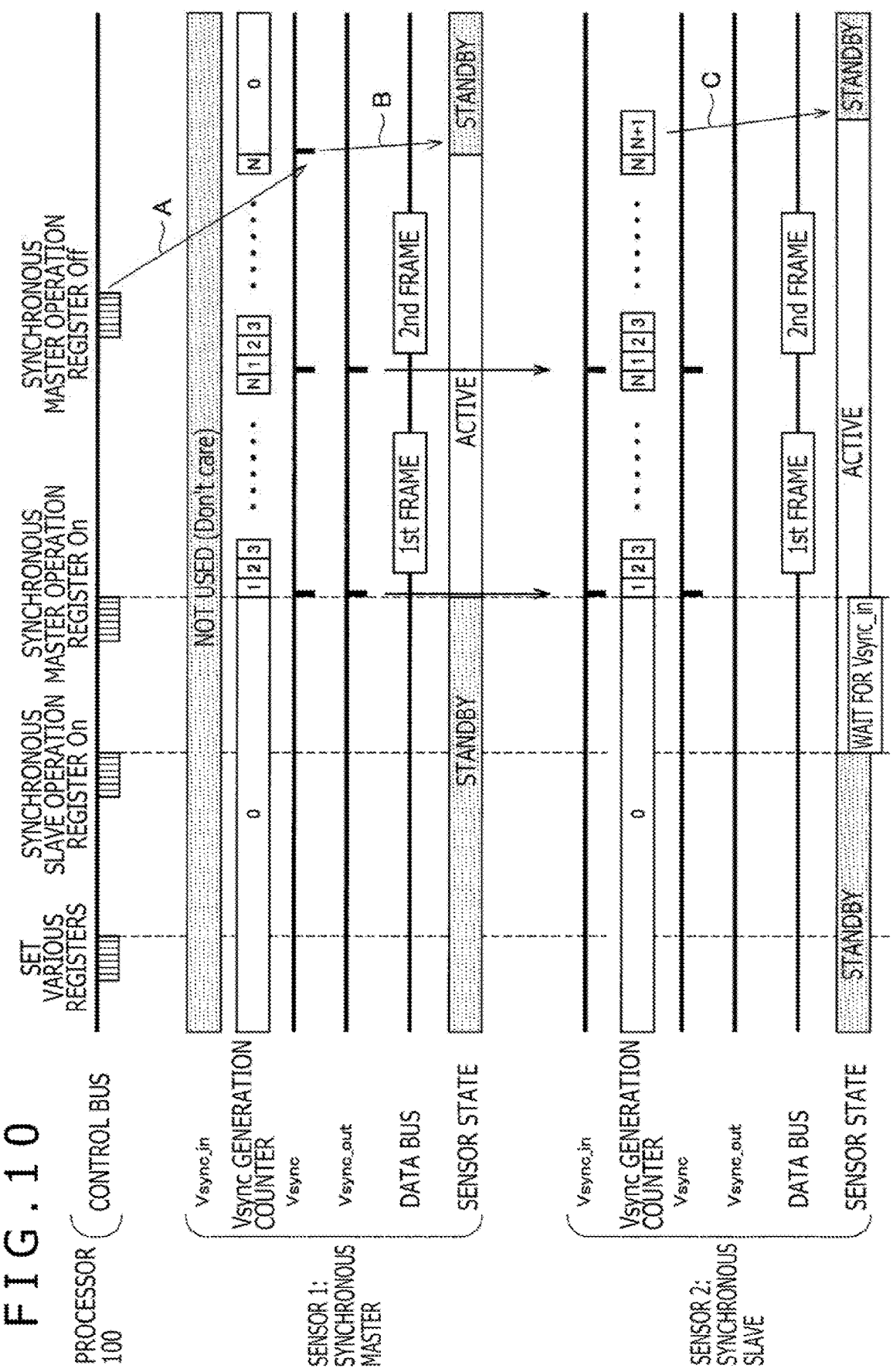
FIG. 10 is an explanatory diagram depicting an example of operation of the control system according to the first embodiment.

FIG. 10 is an explanatory diagram depicting an example of operation of the control system 1000 according to the first embodiment. FIG. 10 corresponds to a diagram collectively depicting operation of the sensor 200 functioning as the synchronous master of the first embodiment depicted in FIG. 8, and operation of the sensor 200 functioning as the synchronous slave of the first embodiment depicted in FIG. 9.

Operation performed at a stop of imaging operation is described with reference to FIG. 10. When a stop request is acquired via the control bus, the sensor 200 functioning as the synchronous master retains a stop request acquisition state using the retention circuit 214 (A in FIG. 10).

In a case where the next synchronous signal Vsync is generated with the stop request acquisition state retained in the retention circuit 214, the sensor 200 functioning as the synchronous master stops imaging operation performed by the imaging unit 202, and does not output the synchronous signal Vsync to the sensor 200 functioning as the synchronous slave by operations of the retention circuit 214 and the mask circuit 216 (B in FIG. 10).

The sensor 200 functioning as the synchronous slave stops imaging performed by the imaging unit 202 in a case where acquisition of the next synchronous signal is not determined before an elapse of a predetermined period from acquisition of the synchronous signal from the sensor 200 functioning as the synchronous master (C in FIG. 10).

For example, according to the control system 1000 of the first embodiment, the sensor 200 functioning as the synchronous master stops imaging operation on the basis of a stop request as depicted in FIG. 10. In addition, for example, the sensor 200 functioning as the synchronous slave in the control system 1000 of the first embodiment considers no acquisition of the synchronous signal from the sensor 200 functioning as the synchronous master within a predetermined period as a stop request, and stops imaging operation as depicted in FIG. 10. Accordingly, in the control system 1000 of the first embodiment, the sensor 200 functioning as the synchronous slave securely stops imaging operation in synchronization with the sensor 200 functioning as the synchronous master.

The control system of the first embodiment is therefore capable of implementing a synchronous stop of imaging operation performed by the plurality of sensors 200.

[3-2] Method for Synchronous Stop of Imaging Operation Performed by Plural Image Sensors in Control System of Second Embodiment Described next is a method for a synchronous stop of imaging operation performed by a plurality of image sensors in the "control system of the second embodiment which includes the processor functioning as the synchronous master" as depicted in FIGS. 4 and 5.

Figure 11:
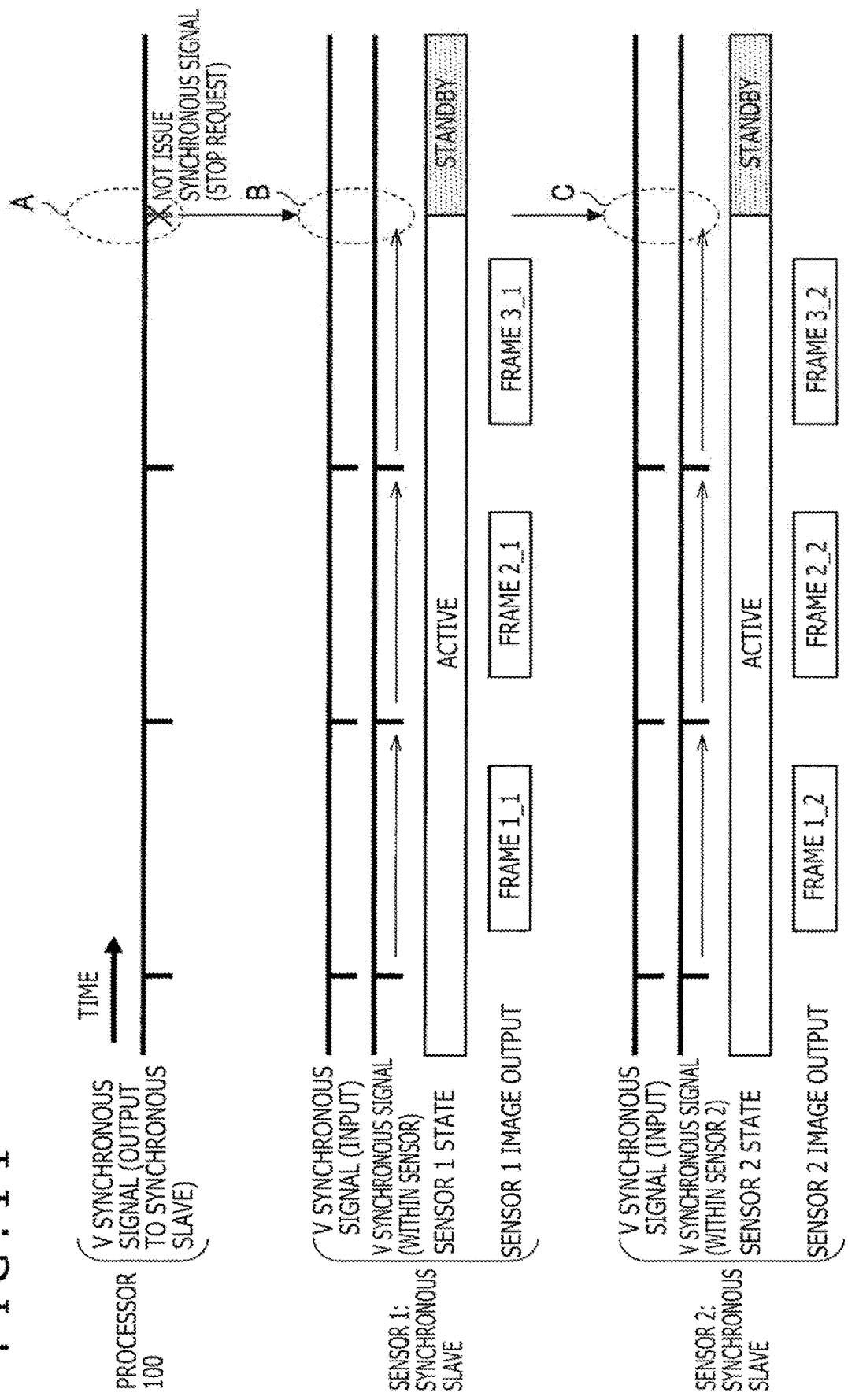
FIG. 11 is an explanatory diagram explaining a method for achieving a synchronous stop of imaging operation performed by a plurality of image sensors of a control system according to a second embodiment.

FIG. 11 is an explanatory diagram explaining a method for a synchronously stop of imaging operation performed by a plurality of image sensors in the control system 1000 according to the second embodiment.

As described above, the control system 1000 of the second embodiment includes the processor 100 and the plurality of sensors 200. According to the control system 1000 of the second embodiment, the processor 100 functions as the synchronous master. Moreover, in the control system 1000 of the second embodiment, all the sensors 200 function as the synchronous slaves. FIG. 11 depicts an example of the sensor 200 indicated as the sensor 1 and the sensor 200 indicated as the sensor 2, both functioning as the synchronous slave.

According to the control system 1000 of the second embodiment, synchronous imaging operation performed by the plurality of sensors 200 is implemented in following manners, for example.

The processor 100 functioning as the synchronous master transmits a synchronous signal (synchronous slave synchronous signal) to all the sensors 200 functioning as the synchronous slaves. The processor 100 transmits the synchronous signal via a signal line different from the data bus and the control bus at set predetermined intervals. For example, the predetermined time interval described above is herein a time interval corresponding to an image size (frame size) indicated by setting information set for each of the sensors 200. As depicted in FIGS. 4 and 5, the processor 100 transmits the synchronous signal via a signal line different from the data bus and the control bus.

All the sensors 200 functioning as the synchronous slaves perform imaging operation in accordance with the synchronous signal (synchronous slave synchronous signal) transmitted from the processor 100 functioning as the synchronous master.

Furthermore, according to the control system 1000 of the second embodiment, a synchronous stop of imaging operation performed by the plurality of sensors 200 is implemented in manners (a) and (b) described below, for example.

(a) A in FIG. 11

In case of a synchronous stop of imaging operation performed by the plurality of sensors 200, the processor 100 functioning as the synchronous master does not transmit a synchronous signal (synchronous slave synchronous signal) to any of the sensors 200 functioning as the synchronous slaves. Accordingly, the processor 100 functioning as the synchronous master does not transmit a stop request to produce a state of no transmission of the synchronous signal as a stop request similarly to the processor 100 constituting the control system of the first embodiment described above.

(b) B in FIG. 11 and C in FIG. 11

As described above, all the sensors 200 constituting the control system of the second embodiment function as the synchronous slaves.

In addition, the sensor 200 functioning as the synchronous slave stops imaging operation in a case where acquisition of the synchronous signal (synchronous slave synchronous signal) acquired from the processor 100 functioning as the synchronous master is not determined within a reception expected period of the synchronous signal. In other words, the sensor 200 functioning as the synchronous slave considers no acquisition of the synchronous signal from the processor 100 functioning as the synchronous master within the predetermined period as a stop request, and stops imaging operation.

More specifically, all the sensors 200 constituting the control system of the second embodiment can stop imaging operation on the basis of whether or not the synchronous signal has been acquired from the apparatus functioning as the synchronous master within the predetermined period, rather than acquisition of a stop request, similarly to the "sensor 200 constituting the control system of the first embodiment and functioning as the synchronous slave" described above.

According to the control system 1000 of the second embodiment, the plurality of sensors 200 stops imaging operation as in (a) and (b) described above, for example.

The processor 100 constituting the control system of the second embodiment and functioning as the synchronous master herein does not transmit the synchronous signal to indicate a stop request as in (a) described above, for example.

In addition, all the sensors 200 constituting the control system of the second embodiment can stop imaging operation not on the basis of acquisition of the stop request, but on the basis of the determination of whether or not the synchronous signal has been acquired from the processor 100 functioning as the synchronous master within the predetermined period.

Accordingly, the control system 1000 of the second embodiment is capable of implementing a synchronous stop of imaging operation performed by the plurality of sensors 200.

Operation of the control system of the second embodiment is hereinafter described.

Figure 12:
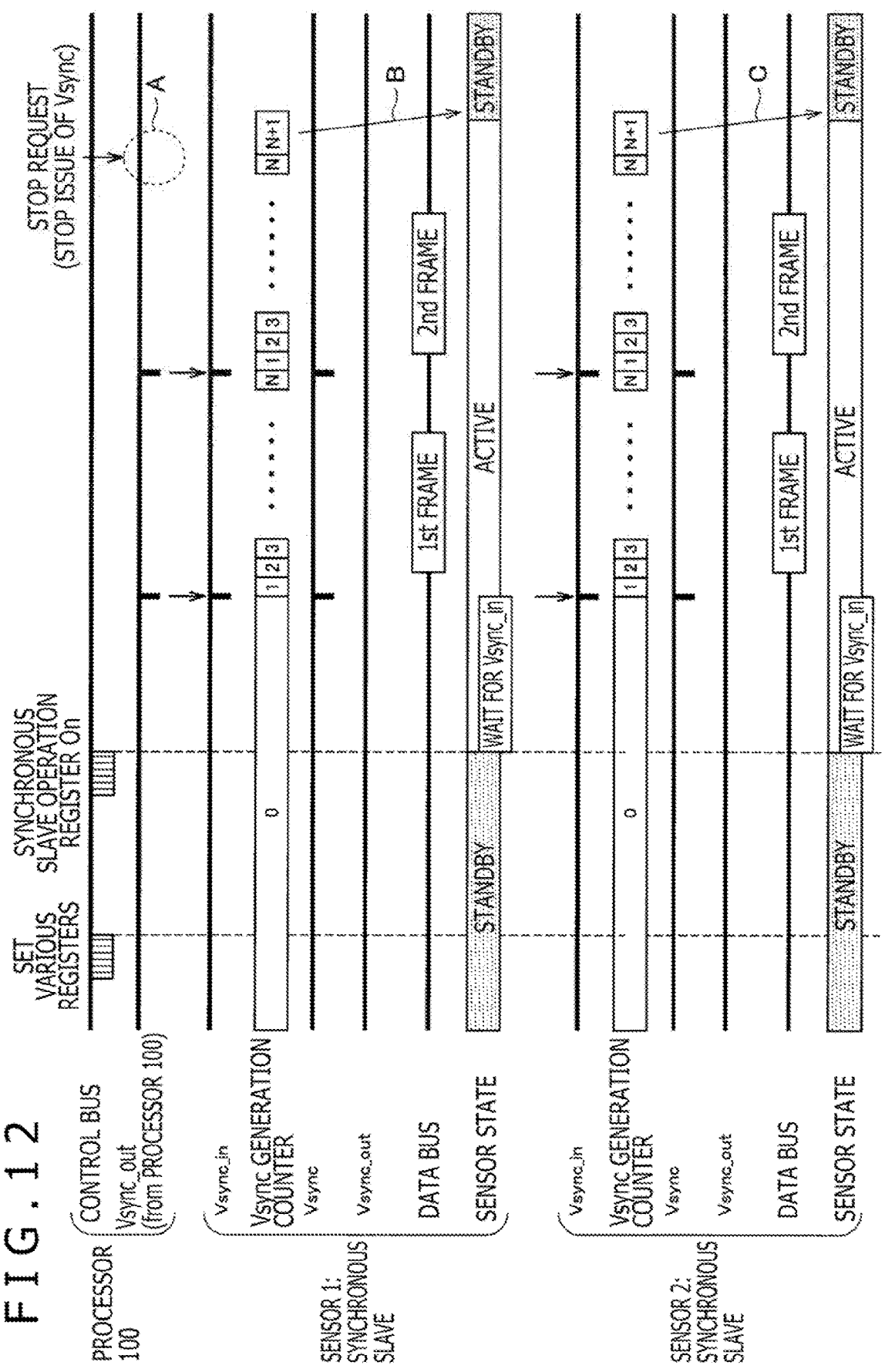
FIG. 12 is an explanatory diagram depicting an example of operation of the control system according to the second embodiment.

FIG. 12 is an explanatory diagram depicting an example of operation of the control system 1000 according to the second embodiment. FIG. 12 depicts operation of the processor 100 functioning as the synchronous master, and operation of the sensor 200 functioning as the synchronous slave.

[3-2-1] Operation of Processor 100 Functioning as Synchronous Master of Second Embodiment After transmission of a start request via the control bus, the processor 100 transmits a synchronous signal (synchronous slave synchronous signal) via a signal line different from the data bus and the control bus at set predetermined time intervals. "Vsync_out (from processor 100)" depicted in FIG. 10 corresponds to the synchronous signal transmitted via the signal line.

In a case where a stop of imaging operation performed by all the sensors 200 is intended, the processor 100 does not transmit the synchronous signal to any of all the sensors 200 (A in FIG. 12).

[3-2-2] Operation of Sensors 200 Functioning as Synchronous Slave of Second Embodiment (Operation of all Sensors 200 Constituting Control System 1000 of Second Embodiment)

When an imaging start request is acquired via the control bus, the sensor 200 waits for reception of a synchronous signal (synchronous slave synchronous signal) from the external device similarly to the "sensor 200 constituting the control system of the first embodiment and functioning as the synchronous slave" described above.

For example, when the synchronous signal is acquired via a signal line different from the data bus and the control bus and connected to the processor 100, the sensor 200 starts imaging operation similarly to the "sensor 200 constituting the control system of the first embodiment and functioning as the synchronous slave" described above.

The sensor 200 resets a value of the Vsync generation counter of the Vcync generation circuit 212 to an initial value, and starts update of the value of the Vsync generation counter on the basis of a trigger of the synchronous signal acquired from the processor 100, similarly to the "sensor 200 constituting the control system of the first embodiment and functioning as the synchronous slave" described above.

The sensor 200 further determines whether the next synchronous signal has been acquired before an elapse of a predetermined period similarly to the sensor 200 constituting the control system of the first embodiment and functioning as the synchronous slave" described above.

In a case where the synchronous signal is acquired from the processor 100 before determination that "the next synchronous signal has been acquired before an elapse of the predetermined period," the sensor 200 causes the imaging unit 202 to perform imaging similarly to the "sensor 200 constituting the control system of the first embodiment and functioning as the synchronous slave" described above.

In addition, the sensor 200 resets a value of the Vsync generation counter of the Vcync generation circuit 212 to an initial value, and starts update of the value of the Vsync generation counter on the basis of a trigger of the synchronous signal acquired from the processor 100, similarly to the "sensor 200 constituting the control system of the first embodiment and functioning as the synchronous slave" described above.

In a case where "acquisition of the next synchronous signal before an elapse of the predetermined period" is not determined, the sensor 200 stops imaging performed by the imaging unit 202 similarly to "the sensor 200 constituting the control system of the first embodiment and functioning as the synchronous slave" described above (B in FIG. 12 and C in FIG. 12).

For example, all the sensors 200 each functioning as the synchronous slave each implement "a stop of imaging operation considering no acquisition of the synchronous signal from the processor 100 functioning as the synchronous master within the predetermined period as a stop request" by performing the operations depicted in FIG. 12.

For example, according to the control system 1000 of the second embodiment, the sensor 200 functioning as the synchronous slave stops imaging operation considering no acquisition of the synchronous signal from the processor 100 functioning as the synchronous master within the predetermined period as a stop request, similarly to "the sensor 200 constituting the control system of the first embodiment and functioning as the synchronous slave" described above as depicted in FIG. 12.

In addition, according to the control system 1000 of the second embodiment, all the sensors 200 function as the synchronous slaves.

Accordingly, the control system 1000 of the second embodiment securely achieves a synchronous stop of imaging operation performed by all the sensors 200 each functioning as the synchronous slave.

The control system of the second embodiment is therefore capable of implementing a synchronous stop of imaging operation performed by the plurality of sensors 200.

[4] Examples of Advantageous Effects Produced by Control System of Present Embodiment For example, following advantageous effects are produced by the control system of the first embodiment described above, or the control system of the second embodiment described above. Needless to say, advantageous effects produced by the control system of the present embodiment are not limited to the advantageous effects described below.

A stop request is not broadcasted via the control bus, but the synchronous signal Vsync is used in a what is called multi-camera system including a plurality of image sensors. Accordingly, a synchronous stop of imaging operation performed by all the image sensors is securely achievable.

The synchronous signal Vsync is used to synchronously stop imaging operation performed by all the image sensors. Accordingly, a synchronous stop of imaging operation performed by all the image sensors is achievable using connection configuration and wiring resources similar to those of an existing multi-camera system, such as the configuration of the control system 1000 depicted in FIG. 1, or the control system 1000 depicted in FIG. 4.

A technical range of the present disclosure is not limited to the preferred embodiments of the present disclosure described in detail herein with reference to the accompanying drawings. It is obvious that various examples of modifications and corrections can occur to those having ordinary knowledge in the technical field of the present disclosure within a category of technical ideas described in the appended claims. It is therefore understood that these modifications and corrections apparently belong to the technical range of the present disclosure.

In addition, advantageous effects to be produced are not limited to the advantageous effects described in the present description presented only for the purpose of explanation or by way of example. In other words, the technology according to the present disclosure can produce other advantageous effects obvious for those skilled in the art in the light of the present description in addition to or in place of the advantageous effects described herein.

Following configurations are also included in the technical range of the present disclosure.

(1)

An image sensor configured to function as a synchronous master that controls synchronous imaging performed by a plurality of image sensors, in which, in a case where a stop request is acquired, the image sensor stops imaging operation on the basis of the stop request, and does not transmit, to a different image sensor functioning as a synchronous slave that performs imaging under control by the synchronous master, a synchronous slave synchronous signal for controlling imaging timing of an image sensor functioning as the synchronous slave on the basis of the stop request.

(2)

The image sensor according to (1), including:

an imaging unit configured to perform imaging and output an image via a data bus; and a control unit configured to control each of imaging performed by the imaging unit, and imaging performed by the different image sensor;

in which the control unit generates a synchronous signal for controlling imaging timing of the imaging unit at set predetermined time intervals and causes the imaging unit to perform imaging on the basis of the generated synchronous signal, the control unit transmits the synchronous slave synchronous signal based on the generated synchronous signal to the different image sensor, and in a case where a stop request is acquired, the control unit stops imaging performed by the imaging unit, and does not transmit the synchronous slave synchronous signal to the different sensor.

(3)

The image sensor according to (2), in which in a case where the stop request is acquired, the control unit retains the acquired stop request, and the control unit stops imaging performed by the imaging unit at a time of initial generation of the synchronous signal after retention of the stop request.

(4)

The image sensor according to (3), in which, in a case where the stop request is retained, the control unit does not transmit the synchronous slave synchronous signal to the different image sensor.

(5)

The image sensor according to any one of (2) to (4), in which the synchronous slave synchronous signal includes the synchronous signal.

(6)

The image sensor according to any one of (2) to (5), in which the stop request is acquired from an external device via a control bus different from the data bus.

(7)

The image sensor according to any one of (1) to (6), further including:

a function as the synchronous slave, in which, in a case where the function as the synchronous slave is effective, imaging operation is stopped when the next synchronous slave synchronous signal is not acquired before an elapse of a set predetermined period from acquisition of the synchronous slave synchronous signal from an external device.

(8)

The image sensor according to (7), in which, in a case where the function as the synchronous slave is effective, the image sensor does not perform the function of the synchronous master.

(9)

An image sensor configured to function as a synchronous slave that performs imaging under control by a synchronous master that controls synchronous imaging performed by a plurality of sensors, in which imaging operation is stopped in a case where, before an elapse of a set predetermined period from acquisition of a synchronous slave synchronous signal from the synchronous master as a signal for controlling imaging timing of the image sensor functioning as the synchronous slave, the next synchronous slave synchronous signal is not acquired.

(10)

The image sensor according to (9), including:

an imaging unit configured to perform imaging and output an image via a data bus; and a control unit configured to control imaging performed by the imaging unit on the basis of the synchronous slave synchronous signal, in which the control unit causes the imaging unit to perform imaging on the basis of the acquired synchronous slave synchronous signal, and the control unit stops imaging by the imaging unit in a case where the next synchronous slave synchronous signal is not acquired before an elapse of the predetermined period from acquisition of the synchronous slave synchronous signal.

(11)

The image sensor according to (10), in which the control unit determines whether the next synchronous slave synchronous signal has been acquired before an elapse of the predetermined period by comparing a value of a counter that indicates a numerical value corresponding to an elapsed time from acquisition of the synchronous slave synchronous signal with a threshold corresponding to a time interval for transmitting the synchronous slave synchronous signal from the synchronous master, and the control unit stops imaging performed by the imaging unit in a case where acquisition of the next synchronous slave synchronous signal is not determined before an elapse of the predetermined period.

(12)

The image sensor according to (11), in which the control unit does not determine acquisition of the next synchronous slave synchronous signal before the elapse of the predetermined period in a case where the value of the counter is larger than the threshold, or in a case where the value of the counter is equal to or larger than the threshold.

(13)

The image sensor according to (11) or (12), in which the control unit resets the value of the counter to an initial value, and starts update of the value of the counter in a case where the synchronous slave synchronous signal is acquired.

(14)

The image sensor according to any one of (10) to (13), in which the synchronous slave synchronous signal is acquired from the synchronous master via a signal line different from the data bus.

(15)

The image sensor according to any one of (9) to (14), in which the predetermined period includes a period longer than a time interval for transmitting the synchronous slave synchronous signal from the synchronous master.

(16)

A control system including:

a processing apparatus; and a plurality of image sensors each connected to the processing apparatus via a data bus and a control bus, in which one of the plurality of image sensors functions as a synchronous master configured to control synchronous imaging performed by the plurality of image sensors, a different image sensor included in the plurality of image sensors functions as a synchronous slave that performs imaging under control by the synchronous master, the image sensor functioning as the synchronous master and the image sensor functioning as the synchronous slave are connected to each other via a signal line different from the data bus and the control bus, and in a case where a stop of imaging operation performed by the plurality of image sensors is intended, the processing apparatus transmits a stop request to the image sensor functioning as the synchronous master via the control bus, the image sensor functioning as the synchronous master stops imaging operation on the basis of the stop request, and does not transmit a synchronous slave synchronous signal for controlling imaging timing of the image sensor functioning as the synchronous slave to the image sensor functioning as the synchronous slave, and the image sensor functioning as the synchronous slave stops imaging operation in a case where the next synchronous slave synchronous signal is not acquired before an elapse of a set predetermined period from acquisition of the synchronous slave synchronous signal.

(17)

The control system according to (16), in which a function performed by each of the plurality of image sensors is set by the processing apparatus via the control bus.

(18)

A control system including:

a processing apparatus; and a plurality of image sensors each connected to the processing apparatus via a data bus, a control bus, and a signal line different from the data bus and the control bus, in which the processing apparatus functions as a synchronous master that controls synchronous imaging performed by the plurality of image sensors, the plurality of image sensors each functions as a synchronous slave that performs imaging under control by the synchronous master, and in a case where a stop of imaging operation performed by the plurality of image sensors is intended, the processing apparatus does not transmit a synchronous slave synchronous signal for controlling imaging timing of the image sensors each functioning as the synchronous slave via the signal line, and the plurality of image sensors each stops imaging operation in a case where the next synchronous slave synchronous signal is not acquired before an elapse of a set predetermined period from acquisition of the synchronous slave synchronous signal.

REFERENCE SIGNS LIST

100 . . . Processor, 200, 200A, 200B . . . Sensor, 202 . . . Imaging unit, 204 . . . Control unit, 206 . . . Pixel array, 208 . . . Pixel reading control circuit, 210 . . . Register, 212 . . . Vsync generation circuit, 214 . . . Retention circuit, 216 . . . Mask circuit, 300 . . . Memory, 400 . . . Display device, 1000 . . . Control system

The invention claimed is:

1. An image sensor configured to function as a synchronous master that controls synchronous imaging performed by a plurality of image sensors,
wherein, in a case where a stop request is acquired, the image sensor stops imaging operation on a basis of the stop request, and does not transmit, to a different image sensor functioning as a synchronous slave that performs imaging under control by the synchronous master, a synchronous slave synchronous signal for controlling imaging timing of an image sensor functioning as the synchronous slave on the basis of the stop request.

2. The image sensor according to claim 1, comprising:
an imaging unit configured to perform imaging and output an image via a data bus; and
a control unit configured to control each of imaging performed by the imaging unit, and imaging performed by the different image sensor;
wherein
the control unit generates a synchronous signal for controlling imaging timing of the imaging unit at set predetermined time intervals and causes the imaging unit to perform imaging on a basis of the generated synchronous signal,
the control unit transmits the synchronous slave synchronous signal based on the generated synchronous signal to the different image sensor, and
in a case where a stop request is acquired, the control unit stops imaging performed by the imaging unit, and does not transmit the synchronous slave synchronous signal to the different sensor.

3. The image sensor according to claim 2, wherein
in a case where the stop request is acquired, the control unit retains the acquired stop request, and
the control unit stops imaging performed by the imaging unit at a time of initial generation of the synchronous signal after retention of the stop request.

4. The image sensor according to claim 3, wherein, in a case where the stop request is retained, the control unit does not transmit the synchronous slave synchronous signal to the different image sensor.

5. The image sensor according to claim 2, wherein the synchronous slave synchronous signal includes the synchronous signal.

6. The image sensor according to claim 2, wherein the stop request is acquired from an external device via a control bus different from the data bus.

7. The image sensor according to claim 1, further comprising:
a function as the synchronous slave,
wherein, in a case where the function as the synchronous slave is effective, imaging operation is stopped when the next synchronous slave synchronous signal is not acquired before an elapse of a set predetermined period from acquisition of the synchronous slave synchronous signal from an external device.

8. The image sensor according to claim 7, wherein, in a case where the function as the synchronous slave is effective, the image sensor does not perform the function of the synchronous master.

9. An image sensor configured to function as a synchronous slave that performs imaging under control by a synchronous master that controls synchronous imaging performed by a plurality of sensors,
wherein imaging operation is stopped in a case where, before an elapse of a set predetermined period from acquisition of a synchronous slave synchronous signal from the synchronous master as a signal for controlling imaging timing of the image sensor functioning as the synchronous slave, the next synchronous slave synchronous signal is not acquired.

10. The image sensor according to claim 9, comprising:
an imaging unit configured to perform imaging and output an image via a data bus; and
a control unit configured to control imaging performed by the imaging unit on a basis of the synchronous slave synchronous signal,
wherein
the control unit causes the imaging unit to perform imaging on the basis of the acquired synchronous slave synchronous signal, and
the control unit stops imaging by the imaging unit in a case where the next synchronous slave synchronous signal is not acquired before an elapse of the predetermined period from acquisition of the synchronous slave synchronous signal.

11. The image sensor according to claim 10, wherein
the control unit determines whether the next synchronous slave synchronous signal has been acquired before an elapse of the predetermined period by comparing a value of a counter that indicates a numerical value corresponding to an elapsed time from acquisition of the synchronous slave synchronous signal with a threshold corresponding to a time interval for transmitting the synchronous slave synchronous signal from the synchronous master, and
the control unit stops imaging performed by the imaging unit in a case where acquisition of the next synchronous slave synchronous signal is not determined before an elapse of the predetermined period.

12. The image sensor according to claim 11, wherein the control unit does not determine acquisition of the next synchronous slave synchronous signal before the elapse of the predetermined period in a case where the value of the counter is larger than the threshold, or in a case where the value of the counter is equal to or larger than the threshold.

13. The image sensor according to claim 11, wherein the control unit resets the value of the counter to an initial value, and starts update of the value of the counter in a case where the synchronous slave synchronous signal is acquired.

14. The image sensor according to claim 10, wherein the synchronous slave synchronous signal is acquired from the synchronous master via a signal line different from the data bus.

15. The image sensor according to claim 9, wherein the predetermined period includes a period longer than a time interval for transmitting the synchronous slave synchronous signal from the synchronous master.

16. A control system comprising:
a processing apparatus; and
a plurality of image sensors each connected to the processing apparatus via a data bus and a control bus,
wherein
one of the plurality of image sensors functions as a synchronous master configured to control synchronous imaging performed by the plurality of image sensors,
a different image sensor included in the plurality of image sensors functions as a synchronous slave that performs imaging under control by the synchronous master,
the image sensor functioning as the synchronous master and the image sensor functioning as the synchronous slave are connected to each other via a signal line different from the data bus and the control bus, and
in a case where a stop of imaging operation performed by the plurality of image sensors is intended,
the processing apparatus transmits a stop request to the image sensor functioning as the synchronous master via the control bus,
the image sensor functioning as the synchronous master stops imaging operation on a basis of the stop request, and does not transmit a synchronous slave synchronous signal for controlling imaging timing of the image sensor functioning as the synchronous slave to the image sensor functioning as the synchronous slave, and
the image sensor functioning as the synchronous slave stops imaging operation in a case where the next synchronous slave synchronous signal is not acquired before an elapse of a set predetermined period from acquisition of the synchronous slave synchronous signal.

17. The control system according to claim 16, wherein a function performed by each of the plurality of image sensors is set by the processing apparatus via the control bus.

18. A control system comprising:
a processing apparatus; and
a plurality of image sensors each connected to the processing apparatus via a data bus, a control bus, and a signal line different from the data bus and the control bus,
wherein
the processing apparatus functions as a synchronous master that controls synchronous imaging performed by the plurality of image sensors,
the plurality of image sensors each functions as a synchronous slave that performs imaging under control by the synchronous master, and
in a case where a stop of imaging operation performed by the plurality of image sensors is intended,
the processing apparatus does not transmit a synchronous slave synchronous signal for controlling imaging timing of the image sensors each functioning as the synchronous slave via the signal line, and
the plurality of image sensors each stops imaging operation in a case where the next synchronous slave synchronous signal is not acquired before an elapse of a set predetermined period from acquisition of the synchronous slave synchronous signal.

* * * * *